(12) United States Patent
Tsuruoka et al.

(10) Patent No.: US 7,761,517 B2
(45) Date of Patent: Jul. 20, 2010

(54) ADDRESS NOTIFYING APPARATUS AND ADDRESS NOTIFYING METHOD

(75) Inventors: Yukio Tsuruoka, Tokyo (JP); Satoshi Ono, Tokyo (JP); Yusuke Hisada, Saitama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1391 days.

(21) Appl. No.: 10/539,135

(22) PCT Filed: Aug. 30, 2004

(86) PCT No.: PCT/JP2004/012497

§ 371 (c)(1),
(2), (4) Date: Jun. 16, 2005

(87) PCT Pub. No.: WO2005/022394

PCT Pub. Date: Mar. 10, 2005

(65) Prior Publication Data

US 2006/0064507 A1    Mar. 23, 2006

(30) Foreign Application Priority Data

Aug. 29, 2003  (JP) .............................. 2003-307582

(51) Int. Cl.
*G06F 15/16* (2006.01)
(52) U.S. Cl. .................. 709/206; 709/205; 713/176
(58) Field of Classification Search ................... 713/176
See application file for complete search history.

(56) References Cited

U.S. PATENT DOCUMENTS 6,373,940 B2 *  4/2002  Shaffer et al. .......... 379/355.02

(Continued)

FOREIGN PATENT DOCUMENTS

DE    199 39 057 A1    3/2001

(Continued)

OTHER PUBLICATIONS

English translation of JP 06-348628 (foreign patent document entered into file records on Jun. 16, 2005).*

(Continued)

*Primary Examiner*—Jung Kim
(74) *Attorney, Agent, or Firm*—Oblon, Spivak, McClelland, Maier & Neustadt, L.L.P.

(57) ABSTRACT

An address notification device is provided with: a link information list storage part 106 for storing link information list composed of link information including an own address, an address of a communicating party, and process information about processing of communication information to be communicated between the own address and the communicating party address; a change information registration part 132 for adding the link information selected by a link information select part 130 with change information representing the content of the change; a link change information sending part 136 for sending link change information representing a change of the link information to a destination indicated by the communicating party address contained in the link information added with the change information; and a link information change part 138 for changing the link information on the basis of the change information added thereto in response to response information sent from the communicating party in response to the sending thereto of the link change information.

14 Claims, 18 Drawing Sheets

U.S. PATENT DOCUMENTS

| | | | |
|---|---|---|---|
| 6,904,138 | B1 | 6/2005 | Loebig |
| 7,092,994 | B2 * | 8/2006 | Nishio et al. ................ 709/206 |
| 2003/0091167 | A1 | 5/2003 | Hirai |
| 2006/0052091 | A1 * | 3/2006 | Onyon et al. ................ 455/415 |

FOREIGN PATENT DOCUMENTS

| | | | |
|---|---|---|---|
| JP | 06-348628 | | 12/1994 |
| JP | 06348628 A | * | 12/1994 |
| JP | 11-163924 | | 6/1999 |
| JP | 11163924 A | * | 6/1999 |
| JP | 2000-20370 | | 1/2000 |
| JP | 2002-163204 | | 6/2002 |
| JP | 2002-208960 | | 7/2002 |
| JP | 2002208960 A | * | 7/2002 |
| JP | 2002-351786 | | 12/2002 |
| JP | 2002351786 A | * | 12/2002 |
| JP | 2003-78639 | | 3/2003 |
| WO | WO 99/57859 | | 11/1999 |
| WO | WO 03/044673 | | 5/2003 |

OTHER PUBLICATIONS

English translation of JP 2002-351786 (foreign patent document entered into file records on Jun. 16, 2005).*

English translation of JP 11-163924 (foreign patent document entered into file records on Jun. 16, 2009).*

English translation of JP 2003-078639 (foreign patent document entered into file records on Jun. 16, 2009).*

English translation of JP 2002-163204 (foreign patent document entered into record on Jun. 16, 2005).*

English translation of JP 2002-208960 (foreign patent document entered into record on Jun. 16, 2005).*

T. Howes et al.: Network Working Group Request for Comments: 2425, Standards Track, pp. 1-33, Sep. 1998.

F. Dawson; T. Howes: Network Working Group Request for Comments: 2426, Standards Track, pp. 1-42, Sep. 1998.

"Mail Address Change Notification", IBM Technical Disclosure Bulletin, XP 000333778, vol. 36, No. 1, Jan. 1993, pp. 70-72.

* cited by examiner

FIG. 3A

OWN-INFORMATION LIST 310

| NICKNAME (OWN) 312 | ADDRESS (OWN) 314 | USER ID INFO 316 |
|---|---|---|
| BOB (WORK) | bob1@a.com | 10000000 |
| BOB (PRIVATE) | bob2@b.com | 10000001 |
| ANONYMOUS | tmp3@c.com | 10000001 |
| ⋮ | ⋮ | ⋮ |

FIG. 3B

PROFILE INFORMATION LIST 320

| NAME (SELF) 322 | USER ID INFO 324 | KEY INFO 326 (PUBLIC KEY) | 328 (PRIVATE KEY) |
|---|---|---|---|
| BOB A | 10000000 | PkA | SkA |
| BOB B | 10000001 | PkB | SkB |
| ⋮ | ⋮ | ⋮ | ⋮ |

FIG. 4

COMMUNICATING PARTY INFORMATION LIST 410

| PRESENTATION (PARTY) 412 | ADDRESS (PARTY) 414 | USER ID INFO 416 | PUBLIC KEY (PARTY) 418 |
|---|---|---|---|
| TOM (WORK) | tom@a.com | 10000002 | PkX |
| CHARLIE (PRIVATE) | charlie@b.com | 10000003 | PkY |
| ALICE (PRIVATE) | alice@b.com | 10000004 | PkZ |
| | ⋮ | | |

FIG. 5A

LINK INFORMATION LIST 510

| NICKNAME (LINK) 511 | ADDRESS (PARTY) 512 | ADDRESS (OWN) 514 | CHANGE INFO 516 | PROCESS INFO 518 |
|---|---|---|---|---|
| TOM | tom@a.com | bob1@a.com | – | PROCESS INFO 1 |
| CHARLIE | charlie@b.com | bob2@b.com | – | PROCESS INFO 2 |
| ALICE | alice@b.com | bob2@b.com | bob1@a.com | PROCESS INFO 2 |
| ALICE (FOR TEMPORARY USE) | alice@b.com | tmp3@c.com | – | PROCESS INFO 2 |
| CHARLIE (WORK) | charlie@b.com | – | bob1@a.com | PROCESS INFO 2 |
| TOM (OFFICE) | tom@a.com | bob2@b.com | bob1@a.com | PROCESS INFO 2 |
| ⋮ | | | | |

FIG. 5B

SCRIPT LIST 520

| PROCESS INFORMATION 1 | AUTHENTICATE COMMUNICATING PARTY UPON RECEIVING COMMUNICATION INFORMATION<br>MOVE RECEIVED COMMUNICATION INFORMATION TO FOLDER A<br>ADD AUTHENTICATION INFORMATION WHEN SENDING COMMUNICATION INFORMATION |
|---|---|
| PROCESS INFORMATION 2 | MOVE RECEIVED COMMUNICATION INFORMATION TO FOLDER B<br>RETAIN SENT COMMUNICATION INFORMATION IN FOLDER C |
| | ⋮ |

FIG. 6

| TYPE OF MESSAGE | | ADDRESS (PARTY) | ADDRESS BEFORE MODIFICATION (OWN) | MODIFIED ADDRESS (OWN) |
|---|---|---|---|---|
| A OWN ADDRESS MODIFICATION | m | alice@b.com | bob2@b.com | bob1@a.com |
| B DELETION OF LINK INFORMATION | m | alice@b.com | bob2@b.com | * |
| C LINK INFORMATION REGISTERING | m | charlie@b.com | – | bob1@a.com |
| D RESPONSE TO OWN ADDRESS MODIFICATION (PERMIT) | a | alice@b.com | bob2@b.com | bob1@a.com |
| E RESPONSE TO LINK INFO REGISTERING (PERMIT) | a | charlie@b.com | – | bob1@a.com |
| F RESPONSE TO LINK INFO REGISTERING (REJECT) | d | charlie@b.com | – | bob1@a.com |

| | NAME | USER ID INFORMATION | PUBLIC KEY |
|---|---|---|---|
| G ADDITIONAL INFORMATION | i | BOB (PRIVATE) | 10000001 | PkB |

ADDRESS NOTIFYING APPARATUS AND ADDRESS NOTIFYING METHOD

TECHNICAL FIELD

The present invention relates to an address notification device and method and, more particularly, to an address notification device and method by which user terminals of communication services provide notification of their own addresses to each other.

BACKGROUND ART

In communication services on networks, such as telephone, e-mail and IP telephone, it is necessary for each user terminal to prenotify the communicating party of its own address such as telephone number, mail address, SIP URI (Session Initiation Protocol Uniform Resource Identifiers), or IP address. These various addresses will hereinafter be referred to simply as an address.

In communication services, address notification devices have heretofore been used by which user terminals exchange their own addresses.

For example, there has been proposed a system in which the transmitting end (a cell phone equipped with a mailing function, for instance) sends a mail message added with its mail address, and when the address attached to the mail message received at the receiving end is unregistered, it is newly registered, and if the address differs in contents from the pre-registered one, it is modified (updated) with the address added to the received mail message (see, for example, patent document 1). Such a configuration allows registration of the mail address or the like without key input, and hence it provides increased operability.

In the above-said prior art, however, when process information is set about processing of communication information to be sent and received, such as acceptance or rejection of the communication information received at the address added to the mail message, and classification and encryption of the communication information, there arises the problem that the process information needs to be changed corresponding to the modification of the mail address (address).

Patent Document 1: JP Application Kokai Publication No. 2002-163204

DISCLOSURE OF THE INVENTION

Problem to be Solved by the Invention

The present invention is intended to solve such a problem, and has for its object to provide an address notification device that permits address modification without the need for changing the process information about processing of the communication information to be sent and received even if such process information is set.

Means for Solving the Problem

The address notification device according to the present invention is configured to includes:
  a link information list storage part for storing link information list composed of link information including an own address, an address of the communicating party, and process information about processing of communication information to be communicated between the own address and the communicating party address;
  link information select part for selecting link information to be changed;
  a change information registration part for adding the link information selected by said link information select part with change information representing the content of the change;
  a link change information sending part for sending link change information representing a change of said link information to a destination indicated by the communicating party address contained in the link information added with said change information; and
  a link information change part for changing the link information on the basis of said change information added thereto in response to response information sent from the communicating party in response to the sending thereto of said link change information.

The address notification method by said address notification device comprises the steps of:
  (a) sending said link change information indicating a change of said link information to a destination that is the communicating party indicated by the communicating party address contained in said link information with said change information entered therein; and
  (b) changing said link information on the basis of said change information with said change information entered therein in response to response information sent from the address notification device of the communicating party in response to the sending thereto of said link change information.

According to the present invention, since the own address or address of the communicating party is modified in the link information containing these addresses and process information about processing of the communication information to be communicated between the addresses, even if the process information is set in the link information, it is possible to modify the own address or communicating party address without the need for changing the process information.

EFFECT OF THE INVENTION

As described above, according to the address notification device, since the own address or address of the communicating party is modified for the link information containing these addresses and process information representing processing of the communication information to be sent on the basis of the addresses, even if the process information is set in the link information, it is possible to modify the own address or communicating party address without the need for changing the process information.

According to the address notification device of the present invention, addresses are not used for personal identification, but instead an address as the destination of communication information and an user identifier for personal identification are used separately of each other. Accordingly, a plurality of own addresses can each be used for a different communicating party and for a different purpose. The address is private information to be concealed from third parties, and unsolicited communication information may sometimes be received using a list of leaked-out addresses; however, the present invention permits frequent and easy address modification without changing settings for communication with parties, and hence the invention is also effective in preventing such nuisance communications. Furthermore, since the address can be set for each communicating party, it is possible to effect access control to change the address for only a particular party and to permit or reject the classification of communication information. Such access control can also be implemented on the network on the basis of link information that is defined by a pair of source and destination addresses.

Moreover, according to the present invention, the association of addresses with user identifiers assures that multiple addresses are of the identical user. For example, in the case of address modification, it is assured that old and new addresses are of the identical user. Further, when multiple addresses are of the identical users, it can be assured.

Besides, the association of the user identifier with key information permits authentication. This prevents tampering of link change information as well as allows secure address updating based on the authentication of personal identification. The association of the user identifier with the key information may be assured by a public key certificate or the like.

According to the address notification device of the present invention, since own addresses are managed as links in association with communicating party addresses, a plurality of links can be established to the identical communicating party, and the respective links can each be used for a different purpose. For example, by assigning different addresses by purpose, direction such as from A to B and from B to A, and by communication media such as wire and radio, and by managing them as different links, they can be used independently for setting such as encryption or classification of communication information.

In the embodiments described in this specification, control information such as link change information or response information is sent over a link to be controlled, but provision is made such that processing of the link change information or response information being received does not depend on the link over which it was sent. That is, if the communicating party does not change, the link change information or response information may be sent over a link different from that to be controlled. For example, in the case where a link using normally-operable, low-speed communication media and a link using temporarily-operable, high-speed communication media are available for communication with the identical party and the address of the high-speed link changes frequently, the link information for the high-speed link may be sent over the low-speed link. This allows efficient use of the link on the temporarily-available communication media.

In addition, since user's address and nickname are managed independently of each other, the user interface using the user's name remains unchanged even if the address is modified. In other words, the user is allowed to perform operation using the nickname without taking the address into account, and hence the user is capable of conducting operation without the need for paying particular attention to automatic address modification and with safety.

While the invention will be described as being applied to an e-mail system, the address is not limited specifically to the e-mail address but may also be an IP address, telephone number, SIP URL and so forth.

BRIEF DESCRIPTION OF THE DRAWINGS

FIGS. 3A and B are explanatory diagrams showing, by way of example, data formats of a own information list and profile information list according to an embodiment of the present invention, respectively.

FIG. 4 is an explanatory diagram showing an example of the data format of a communicating party information list according to an embodiment of the present invention.

FIGS. 5A and B are explanatory diagrams showing, by way of example, data formats of a link information list and a script list according to an embodiment of the present invention, respectively.

FIG. 6 is an explanatory diagram showing, by way of example, data formats of link change information according to an embodiment of the present invention, A showing own address modification, B deletion of link information, C link information registration, D a response to own address modification (permission), E a response to link information registration (permission), F a response to link information registration (rejection), and G additional information.

BEST MODE FOR CARRYING OUT THE INVENTION

A description will be given below, with reference to the accompanying drawings, of embodiments of the present invention.

Figure 1:
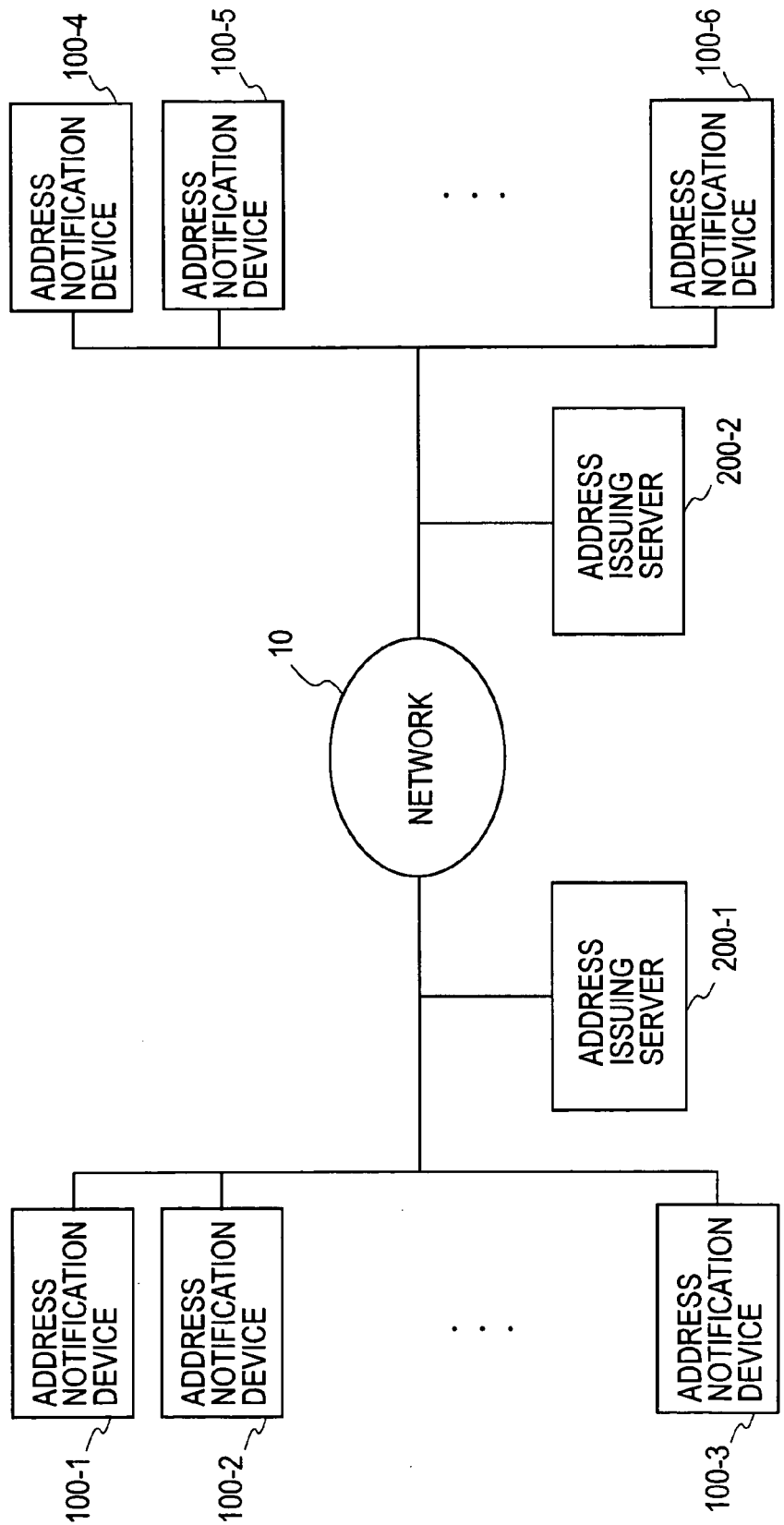
FIG. 1 is a block diagram illustrating the configuration of the address notification system according to an embodiment of the present invention.

FIG. 1 is a block diagram illustrating the configuration of an address notification system 100 according to an embodiment of the present invention.

The address notification system 100 is provided with a plurality of address notification devices 100-1, 100-2, . . . connected via a network 10, and more than one address issuing server 200-1 and 200-2 for issuing addresses to the address notification devices.

While in FIG. 1 there are shown six address notification devices 100-1 to 100-6 and two address issuing servers 200-1, 200-2 in the interests of simplicity of description, the number of address notification device 100 or address issuing servers 200 is not limited specifically thereto. In the following description any one of the address notification devices 100-1 to 100-6 will be referred to as an address notification device 100 and either one of the address issuing servers 200-1 and 200-2 will be referred to as an address issuing server 200.

The address notification device 100 exchanges e-mail or similar communication information with another address notification device 100. The address notification device 100 exchanges, with another address notification device 100, addresses that are referred to for sending and receiving communication information.

The address issuing server 200 responds to a request from the address notification device 100 to generate and send an address thereto.

Figure 2:
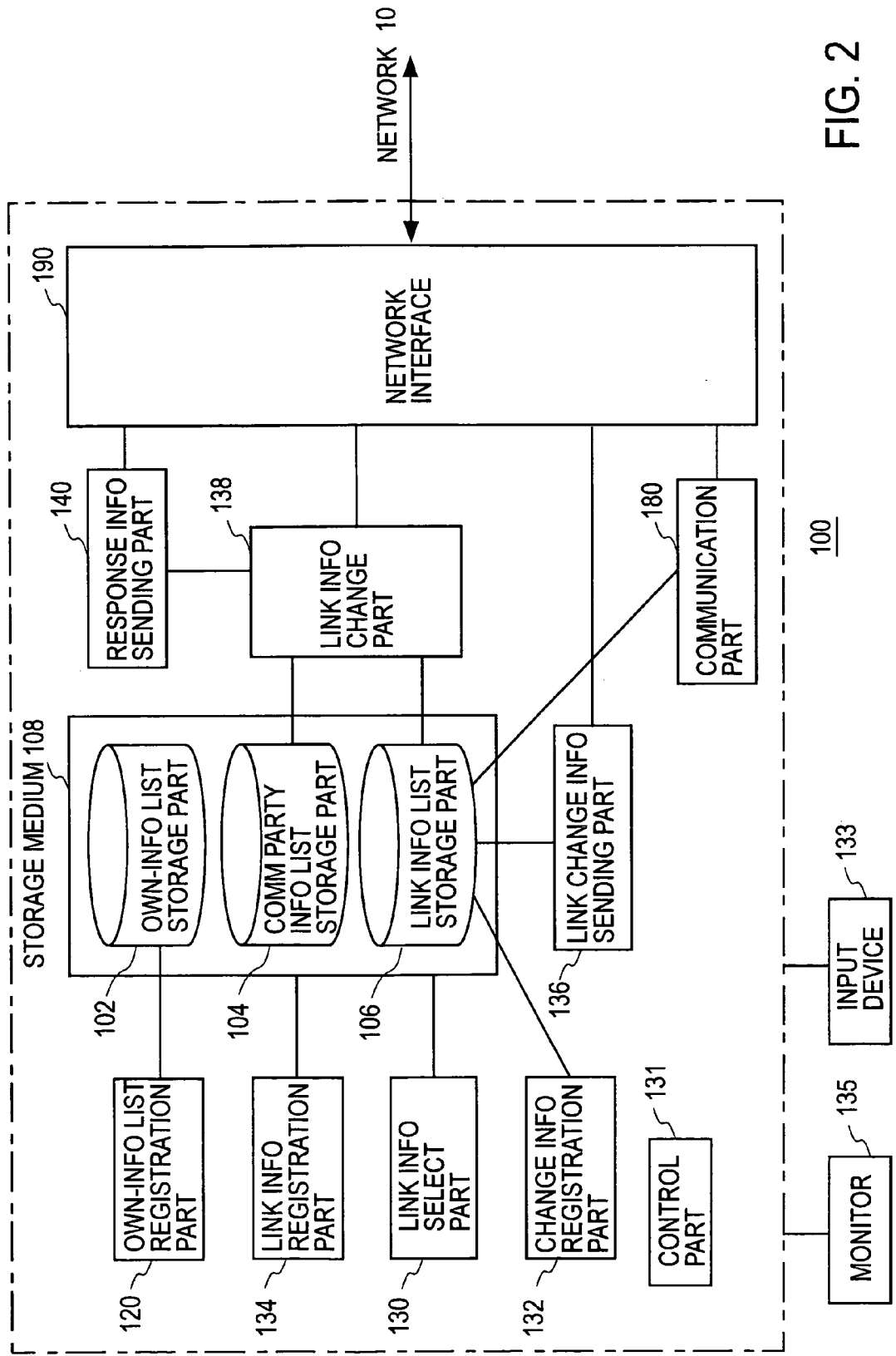
FIG. 2 is a block diagram illustrating the configuration of the address notification device according to an embodiment of the present invention.

FIG. 2 is a block diagram illustrating in detail the functional configuration of the address notification device 100.

The address notification device 100 is to send and receive communication information via the network 10, and it is formed by computer that has a control part 131 formed by a Central Processing Unit (hereinafter referred to simply as "CPU"), an input device 133 such as a keyboard, a pointing device and on, and a monitor 135.

The address notification device 100 has: a own information list storage part 102 for storing a own information list that consists of own information containing own addresses; a communicating party information list storage part 104 for storing a communicating party information list that consists of communicating party information containing communicating party addresses; a link information storage part 106 for storing a link information list that consists of link information containing the own address, the communicating party address and process information about processing of communication information that is communicated between the own address and the communicating party address; a communication part 180 for sending and receiving communication information on the basis of the link information list; and a network interface 190 for establishing communications with respective devices connected to the network 10.

The own information list storage part 102, the communicating party information list storage part 104, and the link information list storage part 106 are formed in a hard disk unit, or flash memory or similar nonvolatile storage medium 108.

In the own information list storage part 102 there are stored the own information list consisting of own information containing own addresses, and a profile information list consisting of user-specific profile information including key information for security use.

Now, a description will be given, with reference to the accompanying drawings, of the own information list and the profile information list that are stored in the own information list storage part 102.

FIGS. 3A and 3B are explanatory diagrams showing, by way of example, the data formats of the own information list 310 and the profile information list 320, respectively.

The own information, which constitutes each row of the own information list 310 includes: a nickname 312 that the user uses to roughly identify his own information; an own address 314; and user identification information 316 for identifying the user associated with his own address. The nickname is given for convenience of user's easy designation of his own address. The user can use different addresses for different communicating parties and for different purposes. For example, in the cases of using the address for business, for private purpose, for anonymity, and in a particular group, application-specific addresses 314 are preset and the nicknames 312 are predetermined which permit identification of such purposes. The user identification information provides a unique identification of virtual user. That is, the user identification information is uniquely associated with the actual user, but the actual user may use different pieces of user identification information for different purposes.

The profile information, which constitutes each row of the profile information list 320 includes: a nickname 322 for roughly identifying the user; user identification information 324 for uniquely identifying the (virtual) user; and two pieces of key information 326 and 328 about encryption and message authentication at the time of sending and receiving communication information. The key information mentioned herein is a public key 326 and a private key 328, for example, in public key cryptosystems.

The own information and the profile information are associated by the user identification information 316 and the user identification information 324.

Turning back to FIG. 2, in the communicating party information list storage part 104 there is stored a communicating party information list consisting of communicating party information including the communicating party address. Now, a description will be given of the communicating party information list that is stored in the communicating party information list storage part 104.

FIG. 4 is an explanatory diagram showing an example of the data format of the communicating party information list. The communicating party information, which constitutes each row of the communicating party information list 410 includes: a nickname 412 for roughly identifying the communicating party by the user; a communicating party address 414; user identification information 416 for uniquely identifying the communicating party; and public keys 418 of the communicating parties. The communicating party nickname 412 corresponds to the (own) nickname 312 of the communicating party side described above with reference to FIG. 3A; similarly, the corresponding-party address 414 corresponds to the own address 314 of the communicating party side, the user identification information 416 of the communicating party corresponds to the pieces of user identification information 324 and 316 of the communicating party side, and the public key 418 of the communicating party corresponds to the public key 326 of the communicating party side. That is, in the case of communicating with a party of a nickname "Tom," the user uses "Bob" as his own nickname "bob1@a.com" as the address 314, and "10000000" as the user identification information 316; similarly, the own nickname 312, the address 314 and the user identification information 316 are predetermined in correspondence to the communicating parties "Charlie" and "Alice."

In the link information list storage part 106 there is stored a link information list 510 that includes, as shown in FIG. 5A, own addresses, communicating party addresses, and process information about processing of the communication information for communication based on these addresses. In the link information storage part 106 there is further stored a script list 520 containing script information that describes processing of the communication information as shown in FIG. 5B; the process information is adapted to indicate script information such as the address where to store the script information.

A description will be given below, with reference to FIGS. 5A and 5B, of the link information list 510 and the script list 520 that are stored in the link information list storage part 106.

FIGS. 5A and 5B are explanatory diagrams showing examples of data formats of the link information list 510 and the script list 520.

As shown in FIG. 5A, the link information, which constitutes each row of the link information list 510 includes: a nickname 511 for roughly identifying the link information by the user; a communicating party address 512, an own address 514; modification information 516 representing the content of modification of the own address; and process information 518. The link information indicates the normal or temporary relationship (the state of link) between the communicating party address and the own address that are used for communication with each communicating party. Accordingly, the use of the identical nickname as that 412 of the communicating party information list 410, for instance, allows ease in identifying the link information, but the nickname need not be identical with the latter. In the example of FIG. 5A, there is given, for each link state, the nickname 511 that enables the user to identify the link state with ease.

In the course of address modification a modified address is entered in the column of the modification information 516, for example the third entry in FIG. 5A indicates the step of modification of the own address from "bob2@b.com" to "bob1@a.com."

In the course of registration of link information the own address is entered in the column of modification information 516, and the fifth entry in FIG. 5A indicates the step of entering link information having the communicating party address "charlie@b.com" and the own address "bob1@a.com."

In the process information 518 there is stored information indicating script information that constitutes the script list 520 depicted in FIG. 5B.

The link information corresponding to that which constitutes the link information list 510 is also stored in the link information list storage part 106 that forms the address notification device 100 of the communicating party. For example, in correspondence to the link information of the first entry in FIG. 5A there is stored, in the link information list 510 in the link information list storage part 106 of the address notification device of the communicating party (Tom), the link information that the communicating party address 512 is "bob1@a.com" and the own address 514 is "tom@a.com."

The communicating party address 512 may be information that refers to the communicating party address 414 in the communicating party information list 410 described previously with reference to FIG. 4, and the own address 514 may be information that refers to the own address 314 in the own information list 310 described previously with reference to FIG. 3A.

Turning back to FIG. 2, the communication part 180 sends and receives communication information via the network interface 190 on the basis of the link information list. For example, in the case of an e-mail, the communication part 180 is implemented by CPU that executes e-mail software; a piece of link information is selected from the link information list 510 by use of the nickname 511 (FIG. 5A), and a mail message, that is, communication information, is sent using the own address 514 and the communicating party address 512 of the selected link information as the source and the destination, respectively.

To enter the own address, the address notification device 100 is further provided with an own information list registration part 120 for entering new own information in the own information list.

The own information list registration part 120 obtains a new address from the address issuing server 200 via the network interface 190, and generates own information containing the obtained address 314 (FIG. 3A).

At the time of generating the own information, the own information list registration part 120 causes the input device 133 of the address notification device 100 to input the nickname 312 (FIG. 3A) to the user, then select user identification information from among the pieces of user identification information 324 stored in the profile information list, and sets the selected user identification information as the user identification information 316. The user identification information 324 contained in the profile information is assumed to be pre-fetched from an external device such as the address issuing server 200 or the like, and it is assumed to have been assigned to users by the address issuing server or the like to provide unique user identification.

Instead of causing the user to enter the nickname, the own information list registration part 120 may be configured to obtain the nickname from a user account name or similar user information prestored in a nonvolatile storage medium such as the storage medium 108.

The pieces of user identification information 324 and 416 may be those which are uniquely associated from public key information, such as fingerprints (hash values) for the pieces of public key information 326 and 418, respectively.

The public key 326 may be chosen so that the user identification information 324 forms part of the public key.

Furthermore, while a piece of user identification information is uniquely associated with one user, user identification information can be allocated so that one user may have multiple pieces of user identification information.

The own information list registration part 120 enters the generated own information in the own information list stored in the own information list storage part 102.

To change link information, the address notification device 100 is further provided with: a link information select part 130 that causes the user to select the link information of the own address to be modified, or the link information to be deleted; a change information registration part 132 that enters change information representing the content of change in the link information; a link information registration part 134 for entering new link information in the link information list; a link change information sending part 136 from which link change information representing the change of the link information is sent to the destination indicated by the communicating party address "alice@b.com" entered in the link information having entered therein the change information (the third entry in FIG. 5A, for instance); and a link information change part 138 in which the link information with the change information entered therein (the third entry) is changed on the basis of the change information in response to response information sent back from the address notification device of the communicating party side in response to the link change information sent thereto.

The link information select part 130 selects the link information whose own address 514 is to be modified or deleted. More specifically, the link information select part 130 causes the monitor 135 to display thereon the link information list 510 stored in the link information list storage part 106, and causes the user to select the link information by use of the input device 133. In the case of modifying the own address 514 constructing the link information, the link information select part 130 displays on the monitor 135 the own information list 310 stored in the own information list storage part 102, and causes the user to select a piece of own information via the input device 133.

The change information registration part 132 enters the change information in the link information selected by the link information select part 130. In the case of modifying the own address 514 constructing the link information selected by the link information select part 130, the change information registration part 132 enters the own address 314, which constructs the own information 310 (FIG. 3A) selected by the link information select part 130, in the column of the change information 516 (FIG. 5A) in the link information 510 selected by the link information select part 130.

Incidentally, in the case where change information has already been entered (the third entry in FIG. 5A, for instance), since the link information is being changed, the change information registration part 132 does not enter the change information in the link information, but instead it displays on the monitor 135 to the effect that no link information can be changed. In the case of deleting the link information selected by the link information select part 130 from the link information list 510, the change information registration part 132 deletes the selected link information from the link information list 510 stored in the link information list storage part 106.

The link information registration part 134 generates new link information (for example, the fifth entry in FIG. 5A) added with change information, and enters the generated link information in the link information list. Specifically speaking, upon input thereto of an instruction for the generation of new link information via the input device 133, the link information registration part 134 causes the user to select a piece of own information from the own information list 310 stored in the own information list storage part 102, a piece of communicating party information from the communicating party list 410 stored in the corresponding-party information list storage part 104, and a piece of script information from the script list 520 stored in the link information list storage part 106, respectively, and at the same time it causes the user to input the nickname 511 of the new link information.

As shown in the fifth entry of FIG. 5A, the link information registration part 134 generates link information using the input nickname as the nickname 511, the blank as the own address 514, the own address constructing the selected own information as the change information 516, the communicating party address constructing the selected communicating party information as the communicating party address 512, and the information indicating the selected script information as the process information 518; the thus generated link information is entered in the link information list 510 stored in the link information list storage part 106.

The link information registration part 134 may be adapted to obtain the nickname 511 of the link information from the nickname 412 (FIG. 4) contained in the selected communicating party information. In the case of entering new link information, if the new link information and the link information already entered in the link information list stored in the link information list storage part 106 constitute links equivalent to each other, the link information registration part 134 displays on the monitor 135 to the effect that the new link information cannot be entered. The equivalent links herein mentioned are those which become identical with each other when two or more pieces of link information are respectively changed on the basis of the entered change information 516. The identical links mean matching of the corresponding ones of the communicating party address 512 and matching of the corresponding ones of the own address 514.

The link change information sending part 136 generates link change information indicating a change of the link information on the basis of the link information entered by the change information registration part 132 or link information registration part 134, and sends the link change information to the address notification device of the communicating party address.

Now, a description will be given of the link change information that is generated by the link change information sending part 136. In the following description, to avoid confusion let it be assumed that the user B is the own side and the user A is the communicating party side, but the address notification devices of the both sides are common in the data format.

FIGS. 6A, 6B and 6C show examples of data formats of link change information for notifying the communicating party of link modifications such as own address modification, deletion of link information and entering of new link information, respectively. FIGS. 6D, 6E and 6F show examples of data formats of a response (permission) to the own address modification notification, a response (permission) to the link information entering notification, and a response (rejection) to the link information entering notification, respectively, and FIG. 6G shows the data format of additional information.

FIG. 6A shows link change information indicating that the user B modifies his own address. In FIG. 6A, "alice@b.com," "bob2@b.com" and "bob1@a.com" represent the address of the communicating party A, the address of the user B before modification and the address of the user B after modification, respectively, providing an indication that the user B changes his own address from "bob2@b.com" to "bob1@a.com."

FIG. 6B shows link change information indicating that the user B has deleted link information. In FIG. 6B, "alice@b.com," "bob2@b.com" and "*" represent the user address of the communicating party A, the address of the user B and the deletion of the link information, providing an indication that the link information representing the link between "alice@b.com" and "bob2@b.com" has been deleted. The deletion of link information is made at the same time as the link change information is sent to the communicating party. That is, this is unilateral processing that does not require permission response by the communicating party.

FIG. 6C shows link change information representing that the user B newly enters link information. FIG. 6C corresponds to the generation of new link information given in the fifth entry in FIG. 5A; "charlie@b.com" and "bob1@a.com" represent the user address of the communicating party A and the address of the user B, respectively, providing an indication that link information representing a link between "charlie@b.com" and "bob1@a.com" is newly entered. After receiving response information of authorization from the communicating party A sent in response to the sending thereto of the link change information (FIG. 6C), the user B changes the link information on the basis of the change information entered in the link information. Incidentally, the symbols m, a, d and i at the heads of the respective data formats are message types indicating change information, response information (authorization), response information (rejection) and additional information, respectively. The data format in FIG. 6A is abbreviated as m(alice@b.com, bob2@b.com, bob1@a.com). This also applies to the data formats in FIGS. 6B, C, D, E, F and G.

Turning back to FIG. 2, the link change information sending part 136 sends the generated link change information via the network interface 190 to the destination indicated by the communicating party address constructing the link information to be changed. The link change information sending part 136 may be configured to add the link change information with signature information which certifies that communication information containing the link change information is free from tampering. The signature information contains a digital signature for the communication information, calculated by use of a private key (for example, the private key 328 in FIG. 3B) of the user of the address notification device 100, and an authenticator for the communication information calculated by use of a secret key shared with the address notification device 100 of the communicating party side.

The link information change part 138 receives, via the network interface 190, response information sent from the address notification device 100 of the communicating party in response to the link change information sent thereto by the link change information sending part 136, and responds to the received response information to change the link information on the basis of the change information entered in the link information. In the response information there is entered the content of change of the link information in the like format as that of the link change information.

Figure 7:
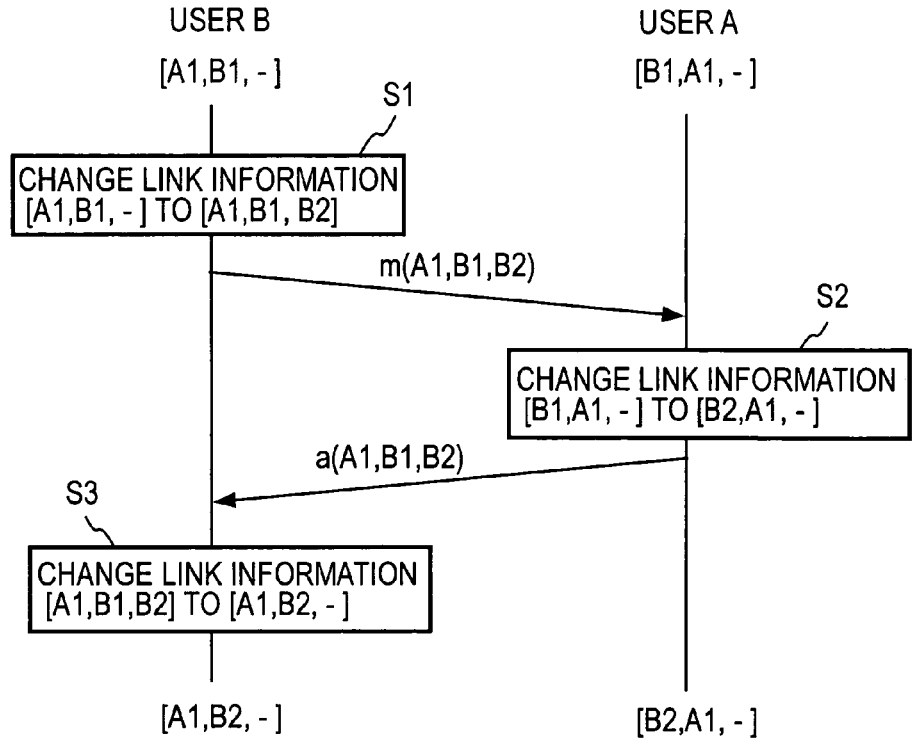
FIG. 7 is a diagram explanatory of the exchange of data between address notification devices for an address modification according to an embodiment of the present invention.

The FIG. 7 example shows the exchange of data between the user A and the user B in order for the user B to change his own address from bob2@b.com to bob1@a.com for the link with which the address bob2@b.com of the user B (Bob) and the address alice@b.com of the user A (Alice) are associated. In this example, the third entry in FIG. 5A indicates the state in which the address of the link information of the user B is being changed. In the following description, for the sake of brevity, alice@b.com, bob2@b.com and bob1@a.com are abbreviated as A1, B1 and B2, respectively. Furthermore, the link information, for which the communicating party address 512, the own address 514 and the change information 516 are A1, B1 and B2, respectively, will be identified by [A1,B1,B2]. A blank will be indicated by "-" for the sake of convenience. For example, the first link information in FIG. 5A is expressed as [tom@a.com, bob1@a.com, -].

In the example of FIG. 7, the format of the link change information that is sent from the user B to notify the user A of the address modification is the format shown in FIG. 6A; this format is abbreviated as m(A1,B1,B2) (corresponding to the third entry in FIG. 5A). Similarly, response information indicating authorization (FIG. 6D) sent in response to the link change information m(A1,B1,B2) is abbreviated as a(A1,B1, B2).

In the example of FIG. 7 let it be assumed that pieces of link information [A1,B1,-] and [B1,A1,-], which correspond to each other in the initial state, are stored in the link information lists of the users B and A, respectively.

Step S1: The user B changes the link information [A1,B1,-] to [A1,B1,B2] (entering the address B2 in the change information 516), and sends to the address A1 of the user A the link modification information m(A1,B1,B2) (FIG. 6A) indicating the change of the address of the user B to B2.

Step S2: The user A receives the link change information m(A1,B1,B2) from the user B, and if he consents to the link change based on the link change information, then changes the corresponding link information [B1,A1,-] to [B2,A1,-] (setting B2 in the communicating party address 512), and sends the response information a(A1,B1,B2) (FIG. 6D) to the address B2 of the user B.

Step S3: Based on the response information a(A1,B1,B2) received from the user A, the link information change part 138 of the user B changes the corresponding link information [A1,B1,B2] to [A1,B2,-] (setting B2 in the own address 512 and a blank in the change information 516), with which the address modification ends.

By the procedure described above, the users B and A obtain link information [A1,B2,-] and [B2,A1,-] having the address of the user B changed from B1 to B2, respectively.

Figure 8:
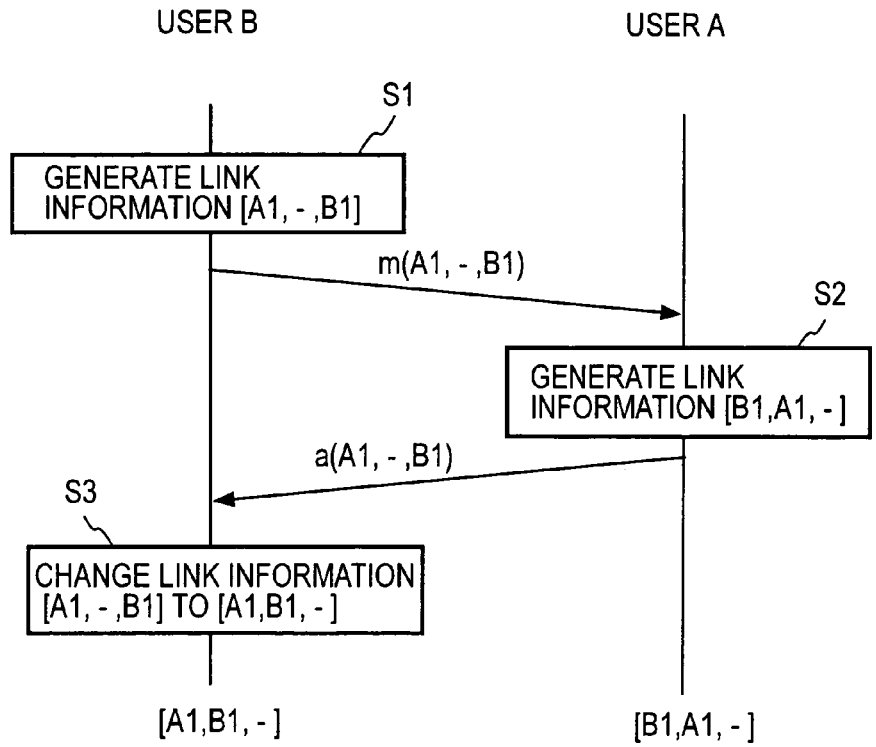
FIG. 8 is a diagram explanatory of the exchange of data between address notification devices for the registration of new link information according to an embodiment of the present invention.

FIG. 8 shows an example of the exchange of data between the users B and A for the registration of new link information. Let it be assumed that the address of the user B is bob1@a.com (abbreviated as B1) and the address of the user A charlie@b.com (abbreviated as A1).

Step S1: The user B generates link information [A1,-,B1] (the fifth entry in FIG. 5A) in which the communicating party address 512, the own address 514 and the change information 516 are A1, a blank "-" and B1, respectively, and sends to the address A1 of the user A the link change information m(A1,-, B1) indicating the registration of the link in which the addresses B1 and A1 are associated with each other.

Step S2: The user A receives the link change information m(A1,-B1) from the user B, and if he permits the registration of link information based on the received link change information, then enters the corresponding link information [B1, A1,-] in the link information list 510 of the user A, and sends response information a(A1,-,B1) (FIG. 6E) indicating authorization of the registration of the link information to the address B1 of the user B.

Step S3: Based on the response information a(A1,-,B1) received from the user A, the link information change part 138 of the user B changes the corresponding link information [A1,-B1] to [A1,B1,-] (setting B1 in the own address 514 and a blank in the change information 516), with which the registration of the link information is completed.

By the procedure described above, the users B and A obtain link information [A1,B1,-] and [B1,A1,-] that indicate a link defined by the address B1 of the user B and the address A1 of the user A.

In the case of rejecting the registration of the link information in FIG. 8, the user A follows such procedure as described below.

Step S2: The user A receives the link change information m(A1,-,B1) from the user B, and in the case of rejecting the registration of the link information based on the received link change information, sends response information d(A1,-,B1) (FIG. 6) indicating the rejection of the registration of the link information to the address B1 of the user B.

Step S3: Based on the response information d(A1,-,B1) received from the user A, the link information change part 138 of the user B deletes the corresponding link information [A1,-,B1], thus resulting in a failure in the registration of the link information.

Figure 9:
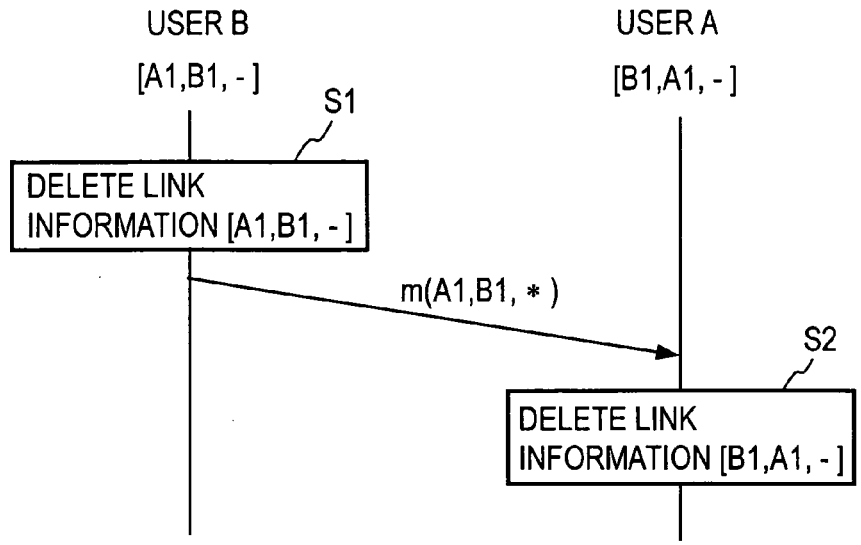
FIG. 9 is a diagram explanatory of the exchange of data between address notification devices for the deletion of a link according to an embodiment of the present invention.

FIG. 9 shows an example of the exchange of data between the users B and A for deleting the link information from the link information list of FIG. 5A. Assume that, letting the address of the user B be represented by bob2@b.com (abbreviated as B1) and the address of the user A by alice@b.com (abbreviated as A1), pieces of link information [A1,B1,-] and [B1,A1,-] corresponding to each other in the initial state are stored in the link information lists of the users B and A, respectively. Further, assume that the user B makes the deletion of link.

Step S1: The user B deletes from the link information list of his own the link information [A1,B1,-] indicating the link to the user A desired to delete, and sends link change information m(A1,B1,*) (FIG. 6B) indicating the deletion of link to the address A1 of the user A.

Step S2: The user A receives the link change information m(A1,B1,*) from the user B, and based on the received link change information, deletes the corresponding link information [B1,A1,-] from the link information list of his own.

By the procedure described above, the users B and A delete the pieces of link information [A1,B1,-] and [B1,A1,-] indicating the link between the address B1 of the user B and the address A1 of the user A.

Incidentally, the deletion of the link information by the user B is unilateral processing, and the communicating party (user A) can no longer use the corresponding link information, and hence it similarly deletes the link information, but it does not send response information to the user B.

In the example of FIG. 7, the user B sends the link change information for address modification to the user A, but there is the possibility that before receiving the link change information, the user A also sends link change information for address modification to the user B. This is the case in which the users B and A simultaneously perform modification of their own addresses. Such a situation may be brought about by a delay in communication, its buffering, or the like; for example, in the case of e-mail, such a possibility may arise from the time difference in arrival between messages, the difference in processing time between mail servers, or a delay in the time of access from the user to the mail server.

Figure 10:
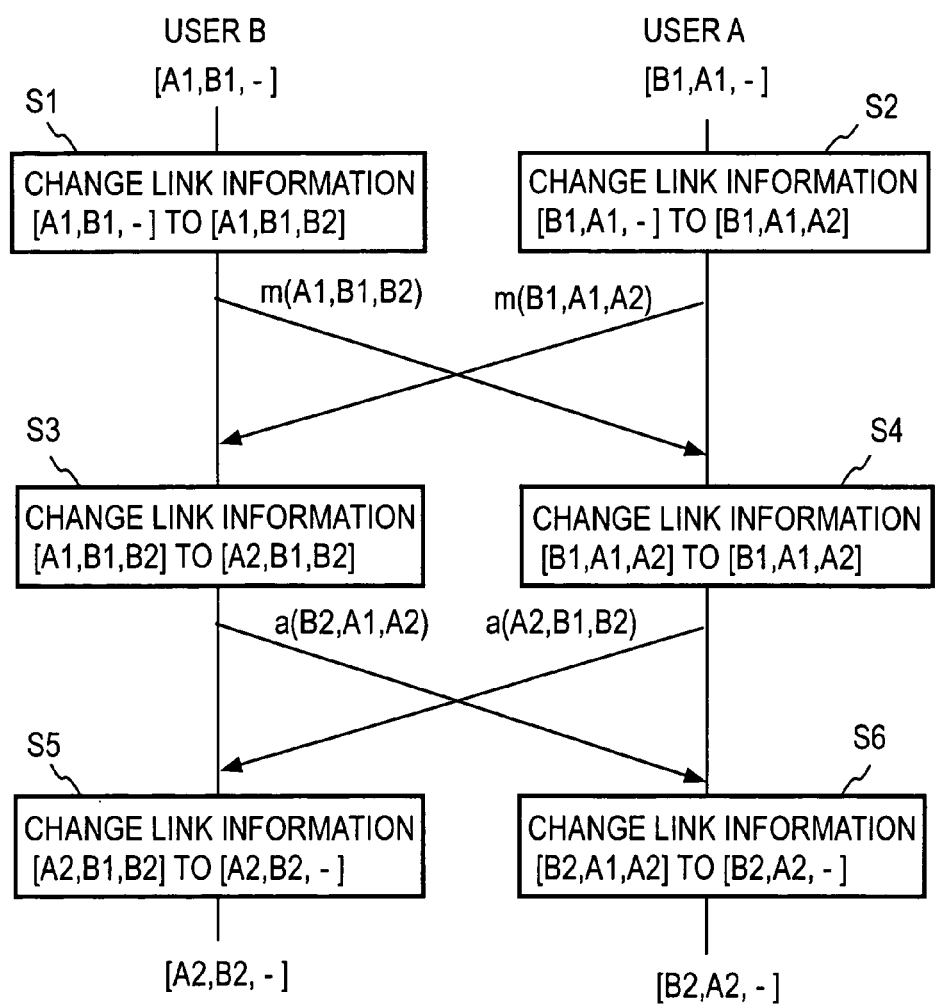
FIG. 10 is a diagram showing an example of the exchange of data between users for simultaneous modification of their addresses on the link therebetween according to an embodiment of the present invention.

In FIG. 10 there is shown an example of the exchange of data between the users B and A when the users B and A simultaneously modify their addresses on the link between them. In this example, let the address of the user B be represented by B1 and the address of the user A by A1, and assume that pieces of link information [A1,B1,-] and [B1,A1,-], which correspond to each other in the initial state, be stored in the link information lists of the users B and A, respectively.

Step S1: The user B changes the link information [A1,B1,-] to [A1, B1,B2], and sends to the address A1 of the user A link change information m(A1,B1,B2) indicating a change of the address of the user B to B2.

Step S2: As in step S1, the user A changes the link information [B1,A1,-] to [B1,A1,A2], and sends to the address B1 of the user B link change information m(B1,A1,A2) indicting a change of the address of the user A to A2.

Step S3: The user B receives the link change information m(B1,A1,A2) from the user A, then changes the corresponding link information [A1,B1,B2] to [A2,B1,B2], and sends response information a(B2,A1,A2) to the address A2 of the user A.

Step S4: As in step S3, the user A receives the link change information m(A1,B1,B2) from the user B, then changes the corresponding link information [B1,A1,A2] to [B2,A1,A2], and sends response information a(A2,B1,B2) to the address B2 of the user B.

Step S5: Based on the response information a(A2,B1,B2) received from the user A, the link information change part 138 of the user B changes the corresponding link information [A2,B1,B2] to [A2,B2,-].

Step S6: As in step S5, based on the response information a(B2,A1,A2) received from the user B, the link information change part 138 of the user A changes the corresponding link information [B2,A1,A2] to [A2,B2,-].

By the procedure described above, the users B and A respectively obtain pieces of link information [A2,B2,-] and [B2,A2,-] with the address of the user B changed from B1 to B2 and the address of the user A changed from A1 to A2.

In the course of modification of the own address, the address before modification is regarded as the own address for a message to be received, and the address after modification is regarded as the own address for a message to be sent. For example, in step S3 the user B is in the course of changing the own address from B1 to B2, but since the address B1 before modification is regarded as the own address for the received link change information m(B1,A1,A2), the link information [A1,B1,B2] is used. On the other hand, since the address B2 after modification is regarded as the own address for the response information to be sent, the response information is a(B2,A1,A2), not a(B1,A1,A2).

As described above, by the procedure according to the present invention, even when the users B and A simultaneously perform address modification between them, it is possible for each user to correctly notify the other of the address modification while maintaining the link between them.

According to the present invention, different addresses can be used for different communicating parties and for different purposes as shown in the example of FIG. 5A; however, the situation arises where it is desirable to merge two or more own addresses into one, for example, at the time of changing an old to a new address or in the case of classifying or reorganizing application-specific addresses by purpose. In such a case, when the user is engaged with identical communicating party using a different address (i.e., a different link), a merge of links results from reorganization of the addresses. For example, the first and sixth entries in FIG. 5A differ in the own address but are common in the communicating party, so that it would be convenient if these two pieces of information could be merged into one piece of link information. The pieces of link information in the first and sixth entries in FIG. 5A can be merged, for example, by changing bob2@b.com entered in the own address 514 in the sixth entry to bob1@a.com as indicated in the change information 516 that is the same as the own address in the first entry.

Figure 11:
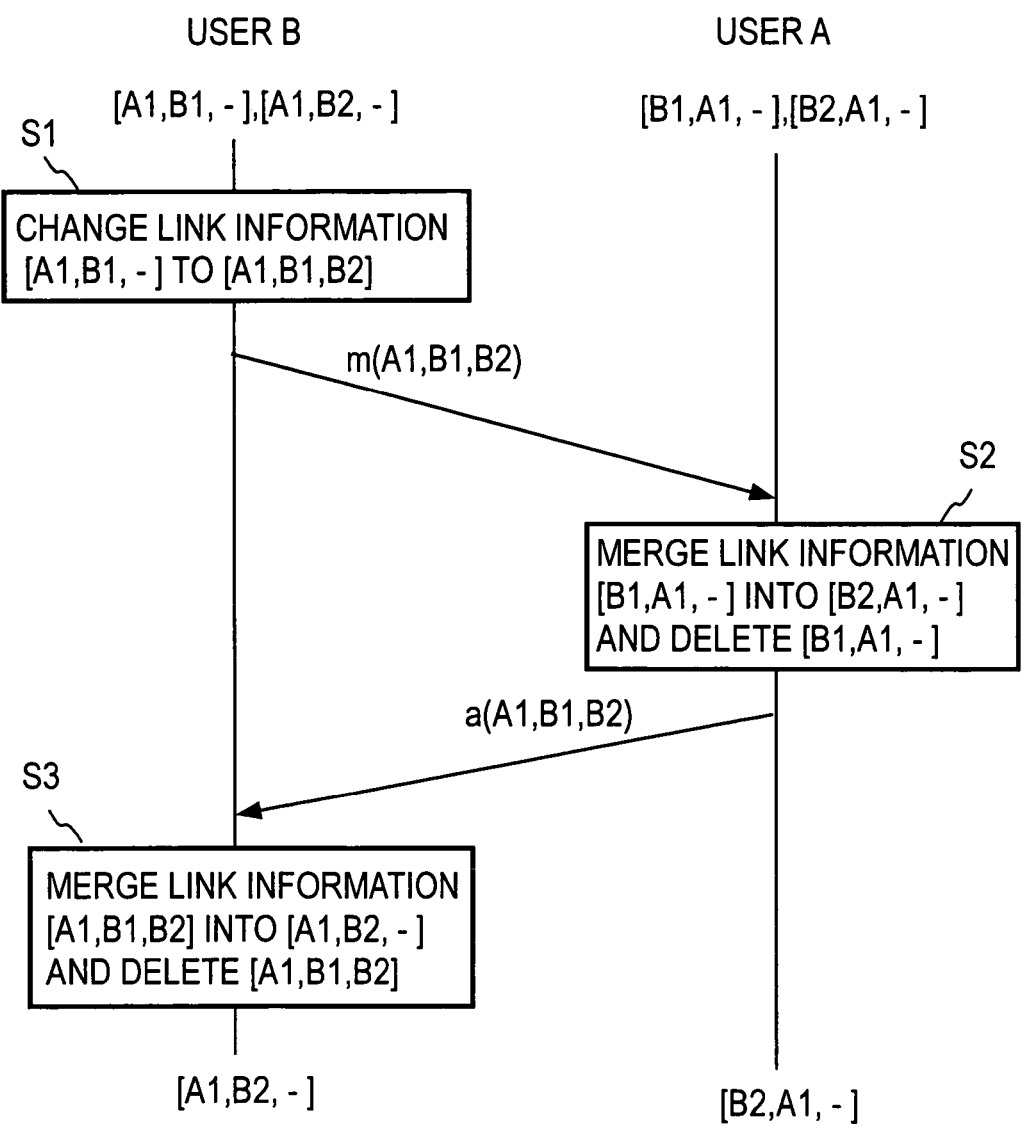
FIG. 11 is a diagram explanatory of the exchange of data between address notification devices for a link information merge according to an embodiment of the present invention.

In FIG. 11 there is shown an example of the exchange of data between the users B and A for merging of links. Assume that: the user B is assigned two addresses B1 and B2; the user A is assigned one address A1; and there are registered between the users B and A two links one of which is established between the addresses B1 and A1 and the other of which is established between the addresses B2 and A1. Furthermore, let it be assumed that, in the initial state, link information [A1,B1,-], [A1,B2,-] and [B1,A1,-], [B2,A1,-] are prestored in the link information lists of the users B and A, respectively, in correspondence to the above-mentioned two links. (In the examples of first and sixth entries in FIG. 5A, bob2@b.com, bob1@a.com and tom@a.com correspond to B1, B2 and A1, respectively.)

Step S1: The user B changes the link information [A1,B1,-] to [A1,B1,B2], and sends to the address A1 of the user A link change information m(A1,B1,B2) (FIG. 6A) to the effect that the address B1 is changed to B2 (the same processing in the FIG. 7 example).

Step S2: The user A receives the link change information m(A1,B1,B2) from the user B, and if he consents to the link change based on the received link change information, changes the corresponding link information [B1,A1,-] to [B2, A1,-], but there is already present the link information [B2, A1,-] that constitutes the identical link, and consequently the user A merges the link information [B1,A1,-] into the prior link information [B2,A1,-], and deletes the link information [B1,A1,-]. And, as is the case with the FIG. 7 example, the user A sends response information a(A1,B1,B2) (FIG. 6D) to the address B2 of the user B. The merge of link information will be described below with reference to processing in step S3.

Step S3: Based on the response information a(A1,B1,B2) received from the user A, the link information change part 138 of the user B changes the corresponding link information [A1,B1,B2] to [A1,B2,-], but since there is already present link information [A1,B2,-] that constitutes the identical link, the link information [A1,B1,B2] is merged into the existing link information [A1,B2,-], after which the link information [A1,B1,B2] is deleted. For example, in the case of merging the link information [A1,B1,B2] in the sixth entry in FIG. 5A into the link information [A1,B2,-] in the first entry, the communicating party address 512 remains unchanged, A1 (tom@a.com), and the own address 514 becomes B2 (bob1@a.com). The nickname 511 of either of the both users can be used, or a new nickname may be given. The processing information 518 of either of the users can be used, or arbitrary information may be re-determined according to the purpose. The modifications are made by the user B on the screen of the monitor 135 via the input device 133. The processing for the merge by the user A in step S2 is the same as described just above.

By the procedure described above, the users B and A obtain pieces of link information [A1,B2,-] and [B2,A1,-] corresponding to one merged link, respectively.

Turning back to FIG. 2, the address notification device 100 has, for receiving and responding link change information, a response information sending part 140 for sending response information via the network interface 190 to the address notification device 100 of the communicating party when link information is changed on the basis of the link change information.

The link change information sent from the address notification device 100 of the communicating party is received by the link information change part 138 via the network interface 190. When the communication information containing the link change information is attached with signature information, the link information change part 138 checks the signature information for validity, and when it is verified that the signature information is invalid, the received communication information may be discarded.

The link information change part 138 changes the link information, depending on the content of the received link change information that indicates the modification of the communicating party address, the registration of link information or the deletion of link information.

When the link change information received by the user A from the user B indicates the address modification of the user B, the link information change part 138 displays the received link change information on the monitor 135, and causes the user to determine whether to delete the target link information via the input device 133. This provides the user A the opportunity to judge whether to delete the target link to disconnect himself from the user B when receiving a notification of address modification from the communicating party (user B). In particular, when the address modification causes a link merge undesirable to the user (A), the chance is given to the user A for deleting the target link to prevent the link merge.

As a result, when the user A does not follow the received link change information but instead inputs his intention of deleting the target link information, the link information change part 138 deletes the target link information from the link information list 510 stored in the link information list storage part 106 and, at the same time, causes the link change information sending part 136 to send link change information indicating the deletion of the target link information.

When the user A inputs his intention of not deleting the target link information, the link information change part 138 displays the received link change information on the monitor 135, and causes the user A to determine, by use of the input device 133, whether to change the own address of the target link information in advance. That is, when notified of address modification from the communicating party, the user A takes this opportunity to determine whether to maintain the connection to the communicating party by the address currently used or to use a different address. In particular, when the received link change information causes a link merge undesirable to the user (A), the chance is given to the user A to modify the own address of the target link to thereby prevent the link merge.

When the user input his intention of premodifying the own address of the target link information, the link information change part 138 causes the user to further select a new own address, then enters the selected own address in the change information 516 of the target link information, and causes the link change information sending part 136 to send link change information to the effect that the own address of the target link information is changed.

In the case where the user inputs his intention of not deleting the target link information and his intention of not premodifying the own address of the target link information, the link information change part 138 causes the response information sending part 140 to send response information.

Figure 12:
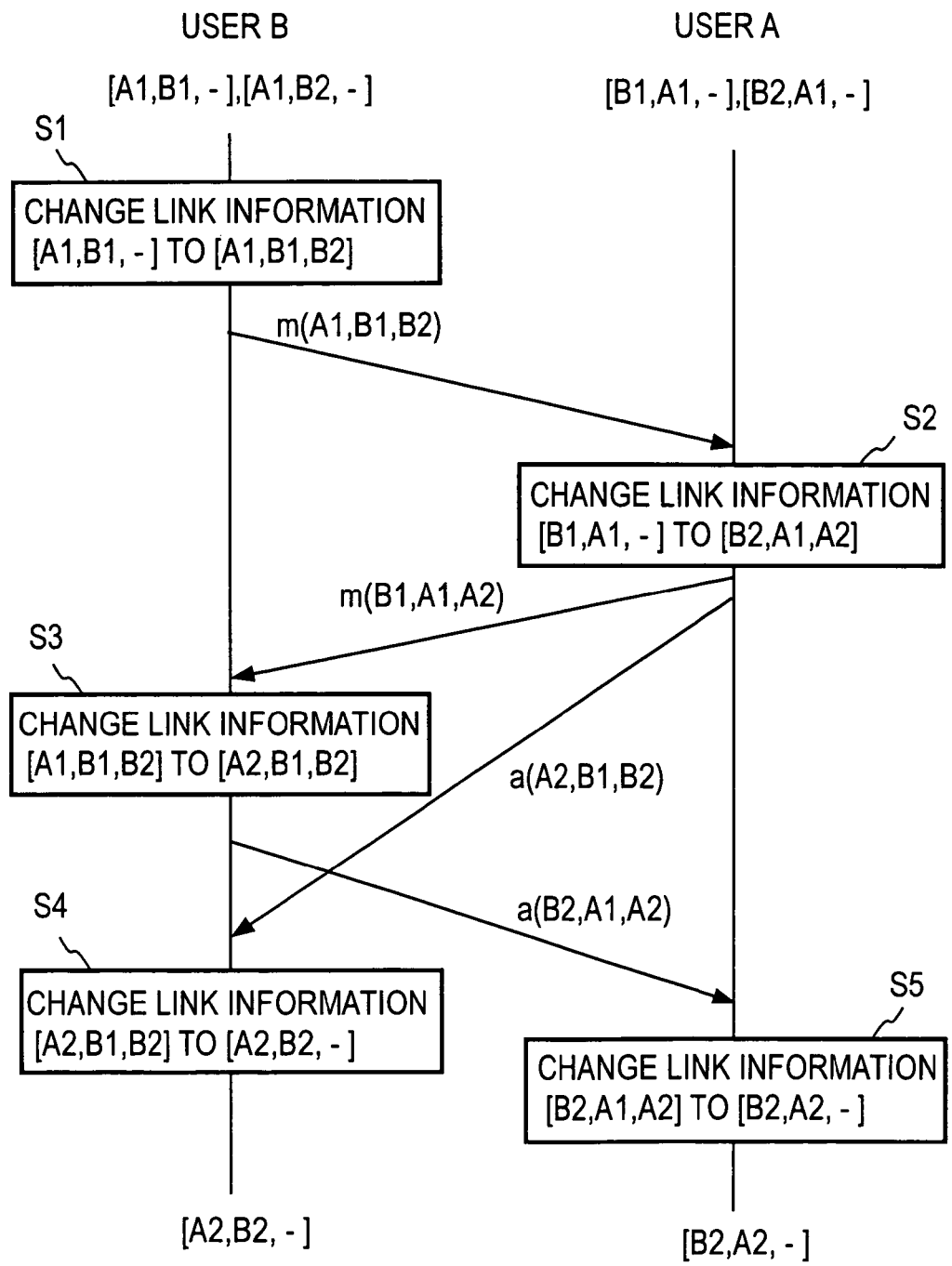
FIG. 12 is a diagram explanatory of the exchange of data between address notification devices for an address modification for rejecting a merge according to an embodiment of the present invention.

The FIG. 7 example shows processing by which upon receiving from the user B the link change information for address modification, the user A consents to the address modification, then change the corresponding link information and sends the response information to the user B; FIG. 12 shows an example of processing by which when the address modification gives rise to a link merge undesirable to the user A, the user A also modifies the own address of the corresponding link so as to prevent the occurrence of merge (rejection of merge).

In the example of FIG. 12 the initial state is assumed to be the same as in the FIG. 11 example. That is, assume that: the user B is assigned two addresses B1 and B2; the user A is assigned one address A1; and there are registered between the users B and A two links one of which is established between the addresses B1 and A1 and the other of which is established between the addresses B2 and A1. Furthermore, let it be assumed that link information [A1,B1,-], [A1,B2,-] and [B1, A1,-], [B2,A1,-] are prestored in the link information lists of the users B and A, respectively, in correspondence to the above-mentioned two links.

Step S1: The user B changes the link information [A1,B1,-] to [A1,B1,B2], and sends to the address A1 of the user A the link change information m(A1,B1,B2) (FIG. 6A) indicating the change of the address B1 to B2 (the same processing as in step S1 in the examples of FIGS. 10 and 11).

Step S2: The user A receives the link change information m(A1,B1,B2) from the user B. Since authorization of this link change causes a link merge, the following processing (rejection of merge) is performed. In the first place, the user A sends to the address B1 of the user B link change information m(B1,A1,A2) indicating modification of the own address A1 in the link information [B1,A1,-] corresponding to the received link change information m(A1,B1,B2). This is followed by changing the link information [B1,A1,-] to [B2,A1, A2] (corresponding to a change from [B1,A1,-] to [B2,A1, A2] via [B1,A1,A2]). Further, the response information a(A2,B1,B2) corresponding to the link change information m(A1,B1,B2) received from the user B is sent to the address B2 of the user B.

Step S3: The user B receives the link change information m(B1,A1,A2) from the user A, then changes the corresponding link information [A1,B1,B2] to [A2,B1,B2], and sends response information a(B2,A1,A2) to the address A2 of the user A (the same processing as in step S3 in the FIG. 10 example).

Step S4: Based on the response information a(A2,B1,B2) received from the user A, the link information change part 138 of the user B changes the corresponding link information [A2,B1,B2] to [A2,B2,-] (the same processing as in step S4 in the FIG. 10 example).

Step S5: Based on the response information a(B2,A1,A2) received from the user B, the link information change part 138 of the user A changes the corresponding link information [B2,A1,A2] to [B2,A2,-] (the same processing as in step S6 in the FIG. 10 example).

By the procedure described above, the users B and A obtains two links, one of which interconnects the addresses B2 and A1, and the other of which interconnects the addresses B2 and A2. That is, the user A rejects the link change intended by the user B for link merging, and can maintain communications with the user B via the two independent links.

In the FIG. 12 example, steps S1, S3 and S4 that are performed by the user B are identical with steps S1, S3 and S5 performed by the user B in the FIG. 10 example. This means that it is impossible for the user B to decide whether the merge of link has been rejected by the user A or the user A happened to modify the own address simultaneously with the own address modification by the user B. In the example of FIG. 12, the user A avoids the merge of link by behaving as if it had premodified the own address.

When the received link change information indicates the registration of the link information, the link information change part 138 displays the received link change information on the monitor 135, and causes the user to determine whether to register the received link information via the input device 133. This determination means that the user is allowed to reject the registration of the link information if it requires the use of an address inconvenient to the user. When the user inputs his intention of rejecting registration of the received link information, the link information change part 138 causes the response information sending part 140 to send the response information indicating the rejection of registration (FIG. 6F).

In addition, if there already exists the link information that constitutes the identical link as that by the newly registered link information, the link information change part 138 performs merge processing.

The link change information sending part 136 of the user B generates, as required, additional information for updating the information about the user B in the communicating party information that is stored in the communicating party information list storage part 104 forming the address notification device 100 of the communicating party (the user A), and sends the additional information via the network interface 190 to the address notification device 100 of the user A.

As depicted in FIG. 6G, the additional information contains a nickname (corresponding to the nickname 312 in FIG. 3A), user identification information (corresponding to the user identification information 324 and 316 in FIG. 3A), and a public key (corresponding to the public key 326 in FIG. 3B).

Specifically speaking, based on the own address forming the link information, the link change information sending part 136 refers to the own information list and the profile information list stored in the own information list storage part 102, then acquires therefrom the own nickname, user identification information and public key, and generates the additional information based on these pieces of information.

The link change information sending part 136 may be configured to add the additional information to the link change information, as required, when sending the latter.

On receiving the additional information via the network interface 190, the link information change part 138 generates communicating party information based on the received additional information, and enters the generated communicating party information in the communicating party information list stored in the communicating party information list storage part 104.

When the communicating party information containing the identical user identification information 416 (FIG. 4) as that contained in the generated communicating party information is already entered in the communicating party information list, the link information change part 138 updates the communicating party information already entered in the communicating party information list with the generate communication-party information. At the time of updating the communicating party information, the link information change part 138 may cause the user to confirm the updating by use of the monitor 135 and the input device 133.

The operation of the address notification device 100 will be described below.

Figure 13:
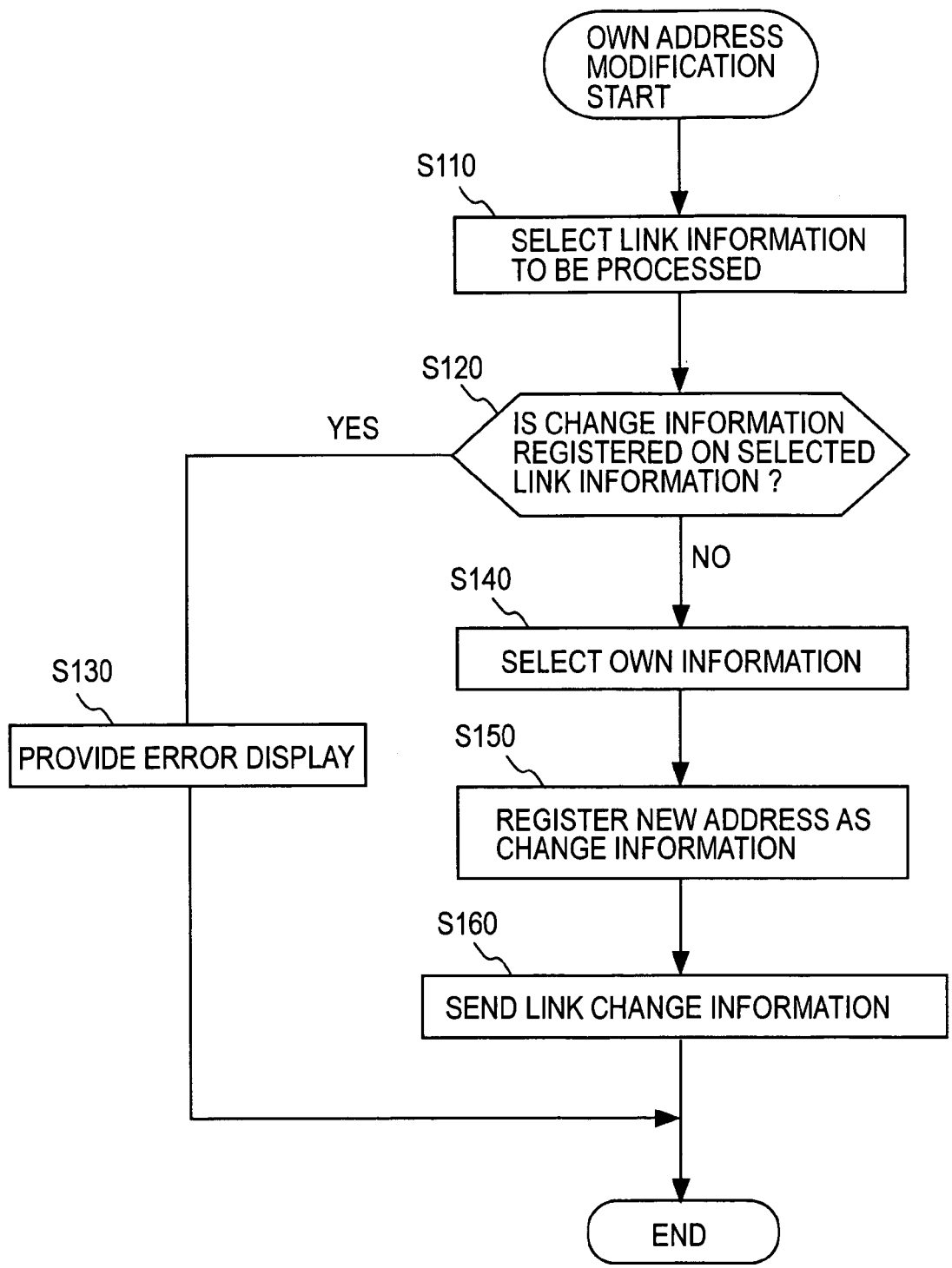
FIG. 13 is a flowchart showing the modification of an own address by the address notification device according to an embodiment of the present invention.

FIG. 13 is a flowchart showing the own address changing operation of the address notification device 100.

In the first place, the link information select part 130 causes the user to select the link information to be processed by use of the input device 133 (S110).

Next, a check is made by the change information registration part 132 to determine if change information has been entered in the link information selected by the link information select part 130 (S120), and when it is determined that change information has been entered in the selected link information, the monitor 135 is caused to provide a display to the effect that the link information cannot be changed (S130). In other words, since that the change information has been entered means that the change is not yet completed, a new change to the link information is not allowed.

On the other hand, when it is decided by the change information registration part 132 that the link information selected by the link information select part 130 has not entered any change information, the link information select part 130 responds to a user's select instruction via the input device 133 to select one piece of own information from the own information list stored in the own information list storage part 102 (S140).

Next, the own address forming the own information selected by the link information select part 130 is entered as change information by the change information registration part 132 in the link information selected by the link information select part 130 (S150), then the link change information to the effect that the own address has been modified is generated by the link change information sending part 136, and it is sent via the network interface 190 to the destination that is the communicating party address forming the link information (S160).

Figure 14:
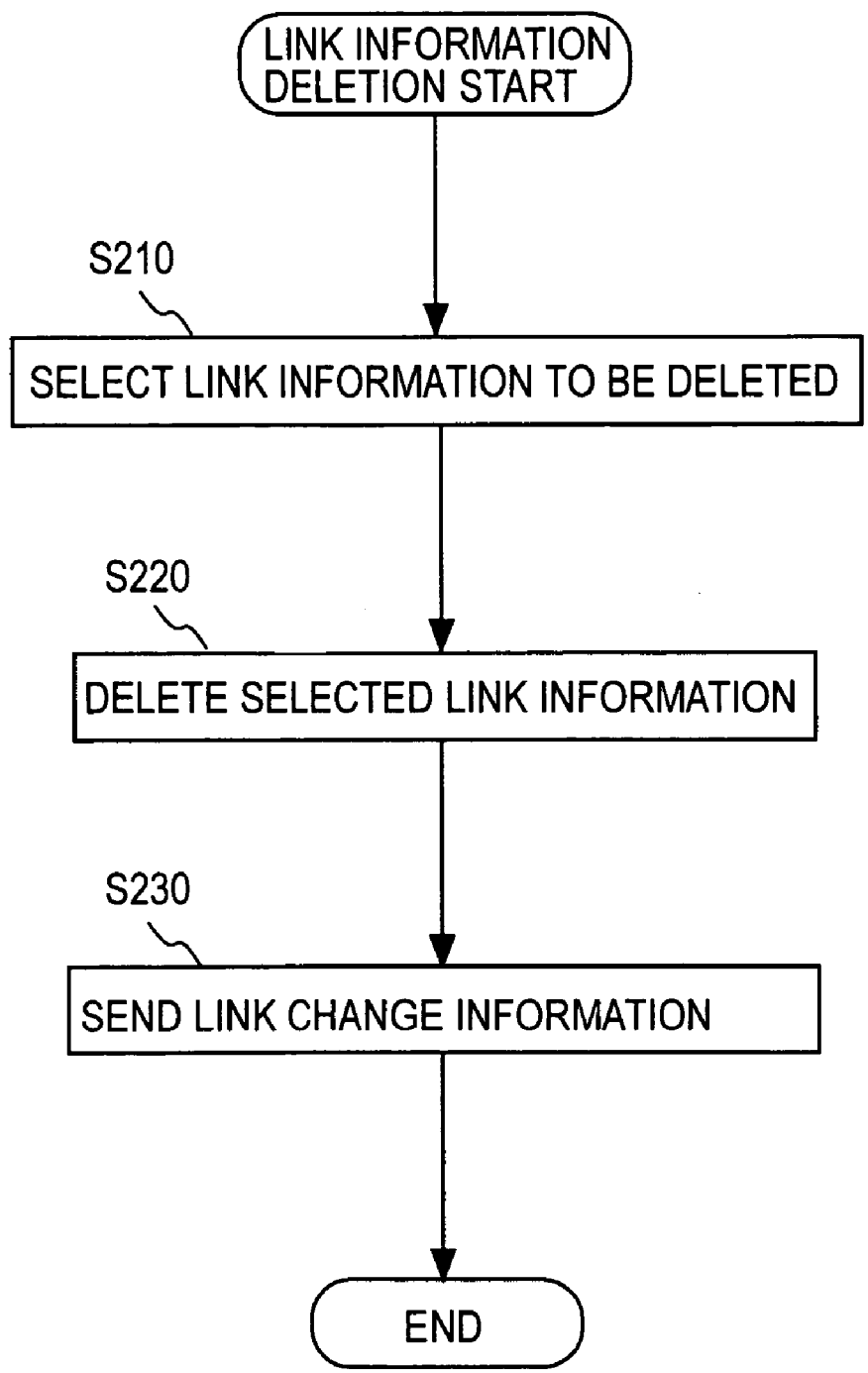
FIG. 14 is a flowchart showing the deletion of link information by the address notification device according to the present invention.

FIG. 14 is a flowchart showing the link information deleting operation of the address notification device 100.

In the first place, the link information select part 130 causes the user to select the link information to be processed via the input device 133 (S210).

Next, the link information selected from the link information list stored in the link information list storage part 106 is deleted by the change information registration part 132 (S220), then the link change information to the effect that the link information has been deleted is generated by the link change information sending part 136, and it is send via the network interface 190 to the destination that is the communicating party address forming the deleted link information (S230).

Figure 15:
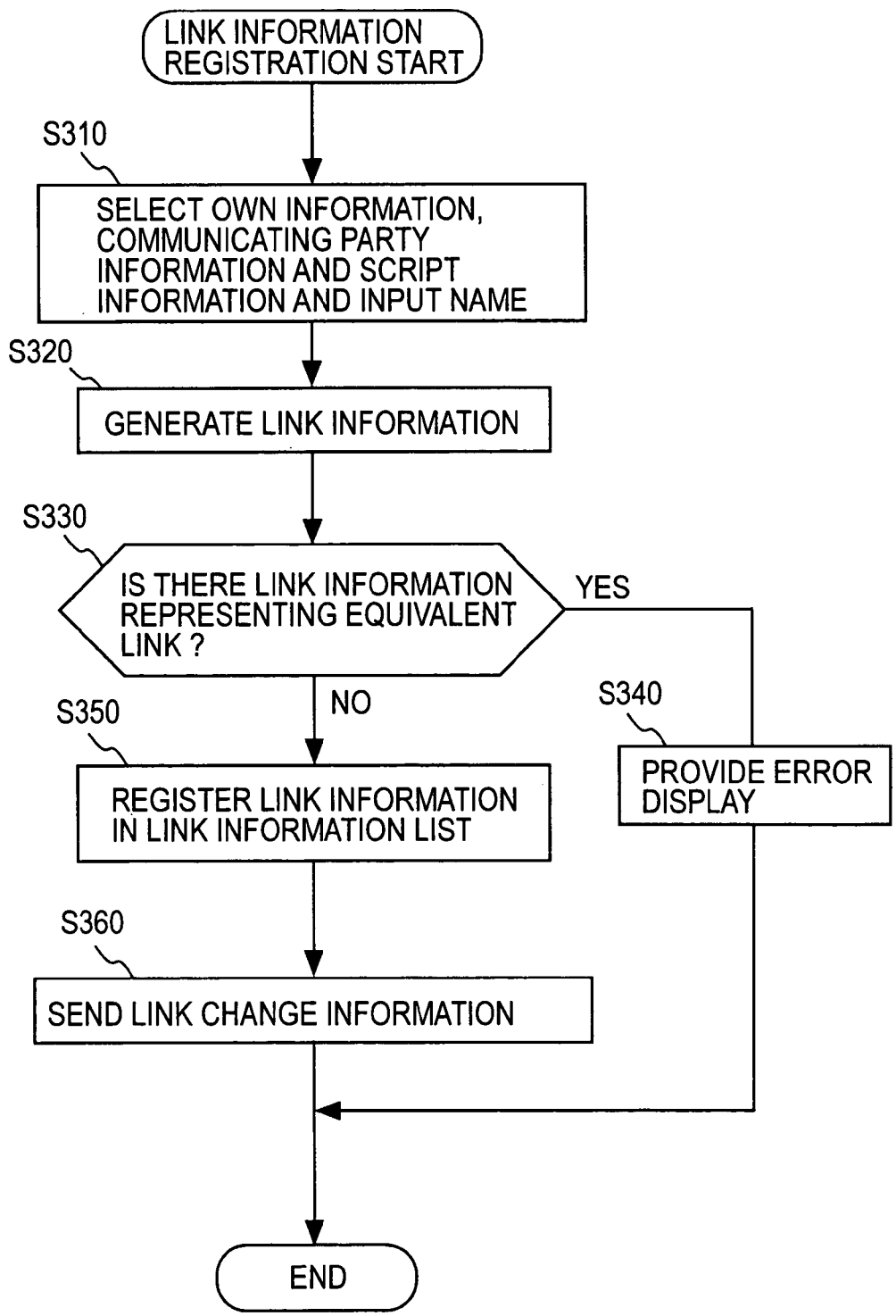
FIG. 15 is a flowchart showing the registration of link information by the address notification device according to the present invention.

FIG. 15 is a flowchart showing the link information entering operation of the address notification device 100.

In the first place, the link information registration part 134 causes the user to select via the input device 133 one piece of own information from the own information list stored in the own information list storage part 102, one piece of communicating party information from the communicating party information list stored in the communicating party list storage part 104, and one piece of script information from the script list 520 stored in the link information list storage part 106, and at the same time, causes the user to input the nickname of the link information to be newly generated (S310).

Next, the link information registration part 134 generates link information in which: the input nickname is used as the nickname 511 of the link information (FIG. 5A); the communicating party address 414 (FIG. 4) forming the selected communicating party information is used as the communicating party address 512 (FIG. 5A); a blank is used as the own address 514 (FIG. 5A); the own address 314 (FIG. 3A) forming the selected own information is used as the change information 516 (FIG. 5A); and the information indicating the selected script information is used as the process information 518 (FIG. 5A) (S320).

Next, a check is made to see if link information equivalent to the link information generated by the link information registration part 314 is contained in the link information list stored in the link information list storage part 106 (S330).

When it is decided that the link information equivalent to that generated by the link information registration part 134 is contained in the link information list, it is displayed on the monitor 135 that the link information generated by the link information registration part 134 cannot be entered (S340).

On the other hand, when it is decided that the link information forming link equivalent to that by the link information generated by the link information registration part 134 is not contained in the link information list, the link information containing change information, generated by the link information registration part 134, is entered in the link information list stored in the link information list storage part 106 (S350).

Next, link change information to the effect that the link information is entered is generated by the link change information sending part 136, and it is sent via the network interface 190 to the destination that is the communicating party address forming the link information to be entered (S360).

Figure 16:
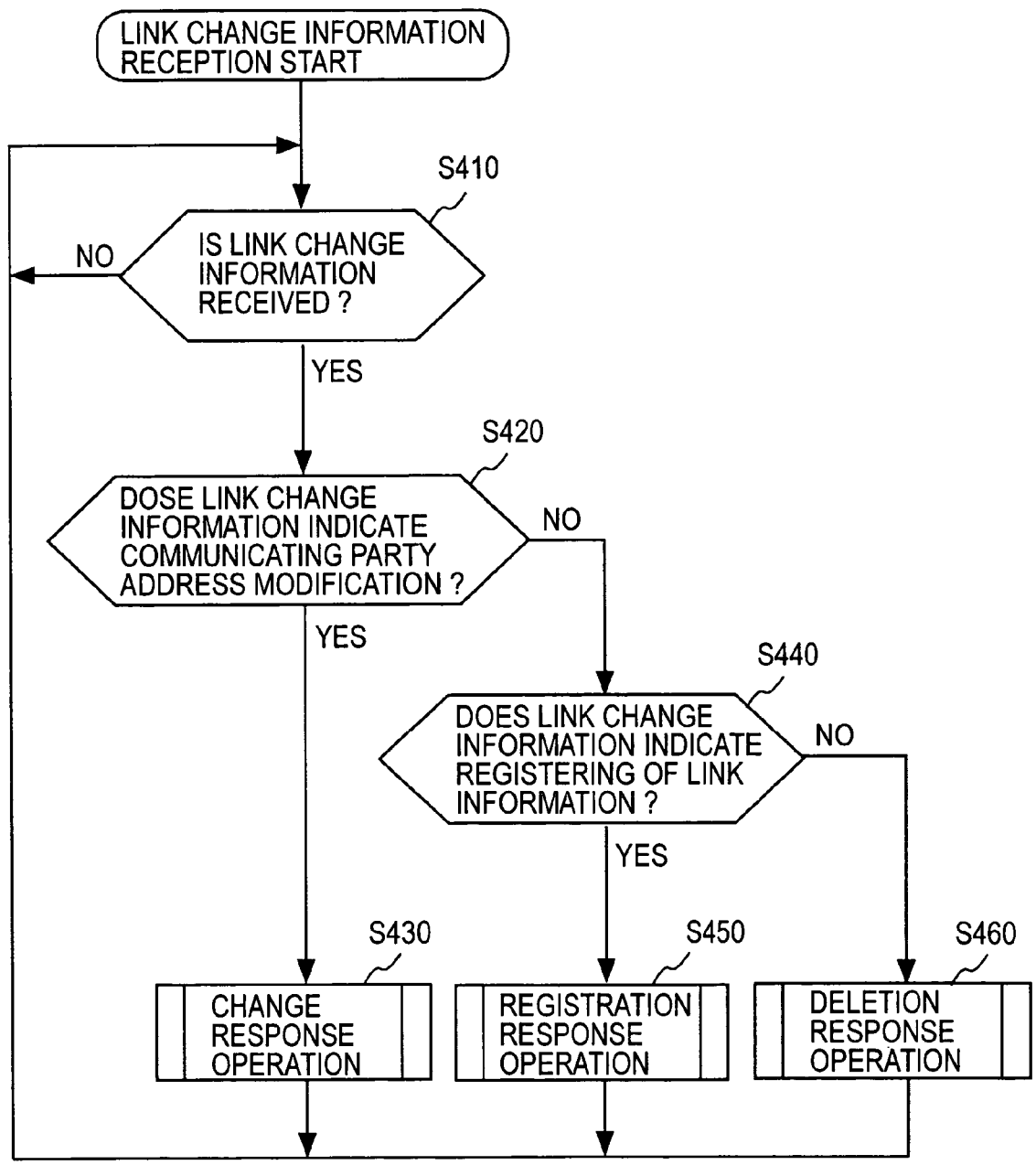
FIG. 16 is a flowchart showing the reception of a link change information by the address notification device according to the present invention.

FIG. 16 is a flowchart showing the link change information receiving operation of the address notification device 100.

In the first place, the link change information sent by the link change information sending part 136 of the address notification device 100 of the communicating party is received by the link information change part 138 via the network interface 190 (S410).

Next, a check is made by the link information change part 138 to see if the received link change information indicates modification of the communicating party address (S420), and when it is decided that the received link change information indicates modification of the communicating party address, the procedure proceeds to the change response operation described later on (S430).

Further, a check is made by the link information change part 138 to determine whether the received link change information indicates registration of the link information (S440), and if it is decided that the received link change information indicates registration of the link information, the procedure proceeds to the registration response operation described later on (S450).

When it s decided by the link information change part 138 that the received link change information does not indicate modification of the communicating party address nor does it indicate registration of the link information, the procedure proceeds to the deletion response operation described later on (S460).

Figure 17:
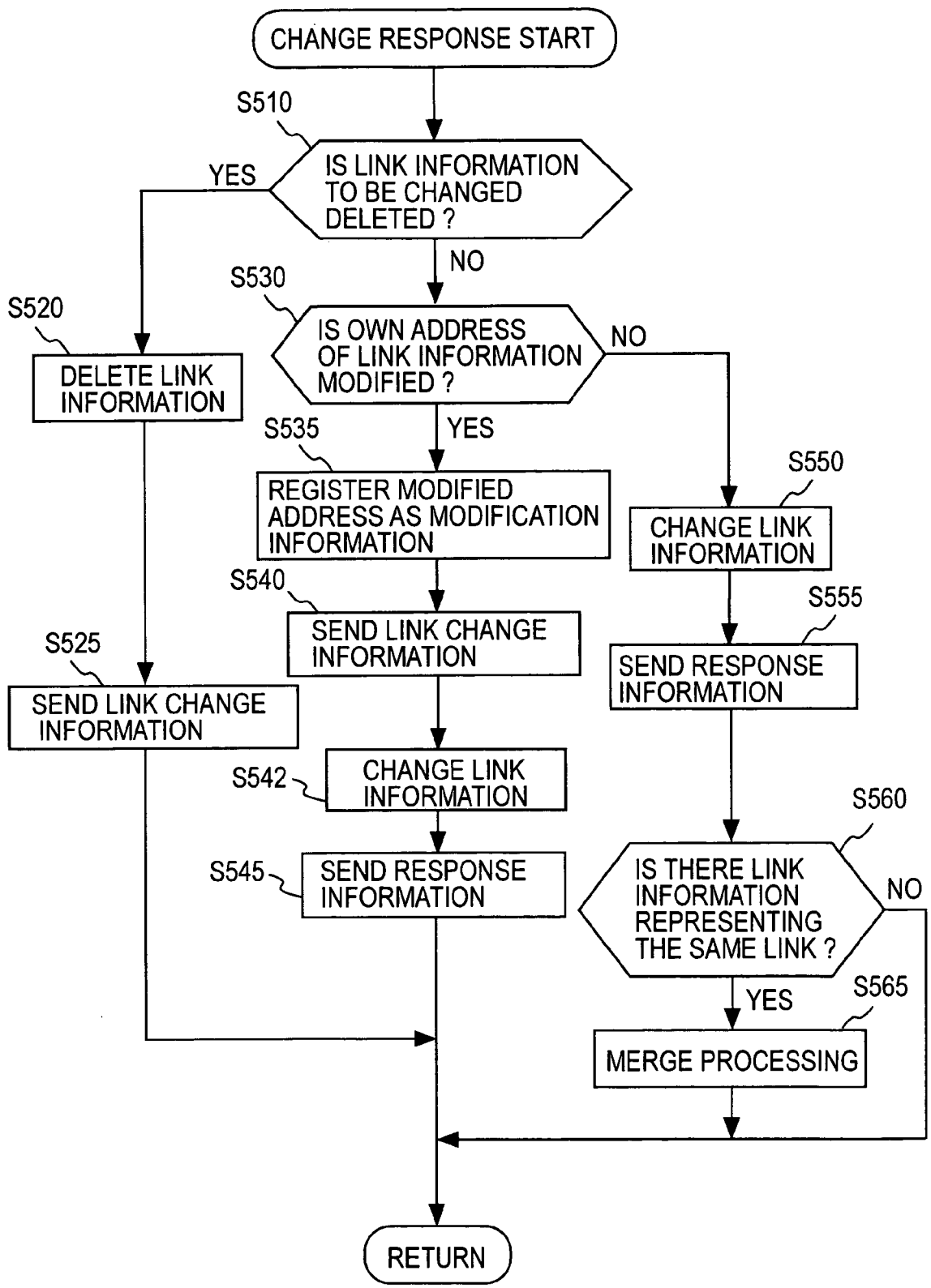
FIG. 17 is a flowchart showing a change response operation of the address notification device according to the present invention.

FIG. 17 is a flowchart showing the operation, in step S43 in FIG. 16, of change response to the link change information indicating modification of the communicating party address.

In the first place, it is decided by the user via the input device 133 whether to delete target link information (S510).

When it is decided that the target link information is to be deleted, the target link information in the link information list stored in the link information list storage part 106 is deleted by the link information change part 138 (S520).

Next, the link change information indicating the deletion of the target link information is sent from the link change information sending part 136 via the network interface 190 to the source of the received link change information (S525).

On the other hand, when it is decided that the target link information is not deleted, it is decided by the user via the input device 133 whether to premodify the own address of the link information to be changed (S530).

When it is decided to premodify the own address of the target link information, the user is caused to select a new own address, then the selected address is entered in the change information of the target link information (S535), and link change information indicating modification of the own address of the target link information is sent from the link change information sending part 136 via the network interface 190 to the source of the received link change information (S540).

Next, the communicating party address of the target link information is changed on the basis of the link change information received by the link information change part 138 (S542), and in response to the link change information received by the link information change part 138, response information having the communicating party address changed to the new address selected by the user is sent from the response information sending part 140 via the network interface 190 to the source of the link change information (S545).

On the other hand, when it is decided that the own address of the target link information is not modified, the link information is changed by the link information change part 138 on the basis of the received link change information (S550).

Next, response information of the same content as that of the link change information received by the link information change part 138 is sent from the response information sending part 140 via the network interface 190 to the source of the link change information. In this case, however, if the change information of the target link information is not blank (that is, in the course of own address modification), response information which is identical with the received link change information except that its communicating party address has been changed to the above-mentioned change information, is sent as a substitute for the above-mentioned response information (S555).

Next, a check is made to see if the link information, which forms the identical link as that by the link information change by the link information change part 138, is contained in the link information list 510 stored in the link information list storage part 106, and if such link information is not found, the procedure ends (S560).

In the case where the change information of the link information changed by the link information change part 138 is blank and it is decided that the link information forming the identical link as that by the change link information is contained in the link information list 510, merge processing is executed by the link information change part 138 (S565).

Figure 18:
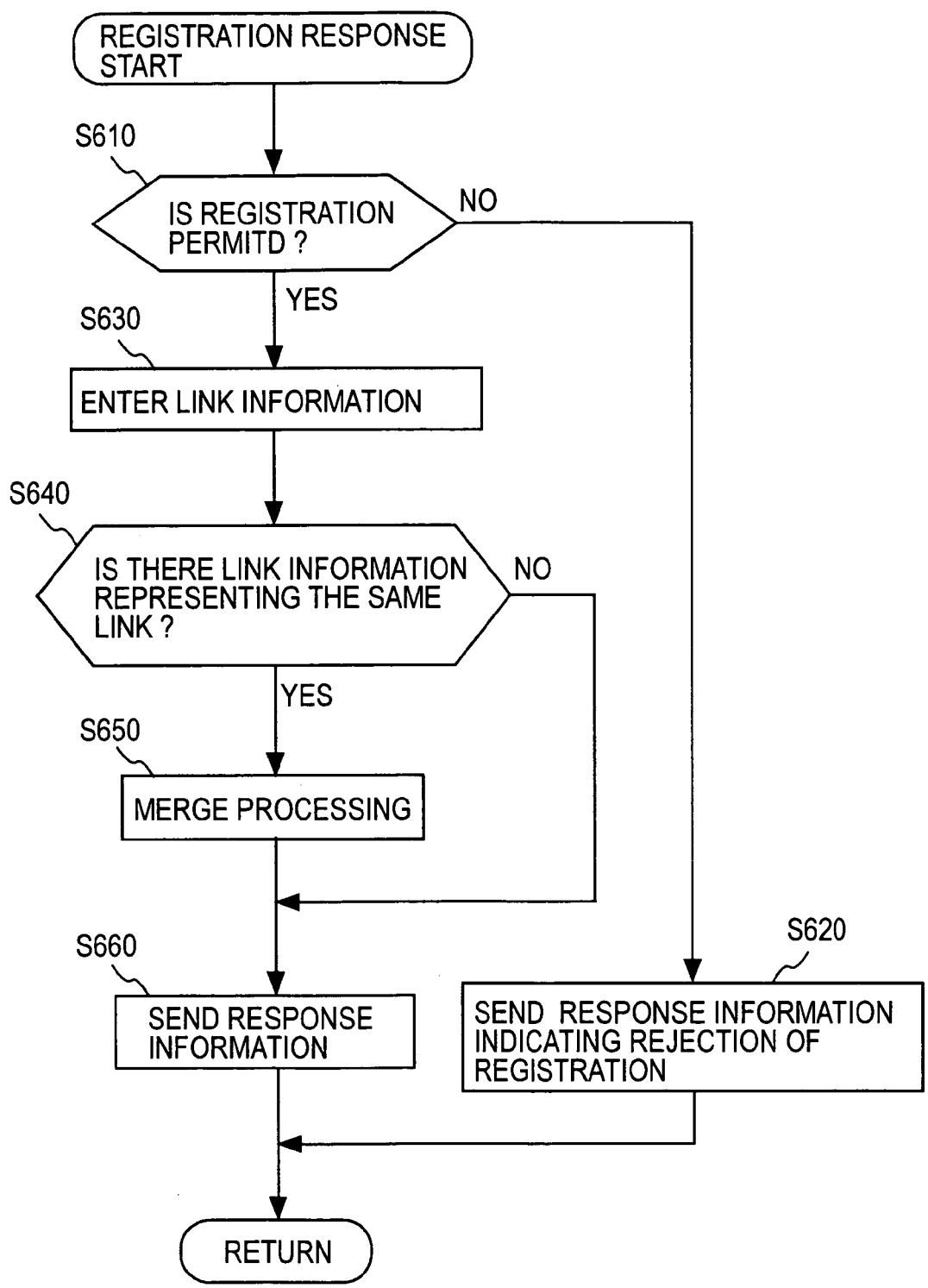
FIG. 18 is a flowchart showing a registration response by the address notification device according to the present invention.

FIG. 18 is a flowchart showing the registration response operation that is performed in step S450 in FIG. 16 in response to the link change information indicating the registration of the link information.

In the first place, it is decided by the user via the input device 133 whether to permit registration of the target link information (S610).

When it is decided that registration of the target link information is not permitted, response information indicating rejection of registration is sent from the response information sending part 140 via the network interface 190 to the source of the link change information (S620).

When it is decided that registration of the target link information is permitted, link information is generated on the basis of the link change information received by the link information change part 138, and the generated link information is entered in the link information list 510 stored in the link information list storage part 106 (S630).

Next, a check is made to see if the link information, which forms the identical link as that by the link information entered by the link information change part 138, is already entered in the link information list stored in the link information list storage part 106 (S640).

When it is decided that the link information forming the identical link as that by the link information entered by the link information change part 138 is already entered, merge processing is carried out by the link information change part 138 (S650).

The registration of the target link information is permitted and the link information is registered, after which response information of the same content as that of the received link change information is sent from the response information sending part 140 via the network interface 190 to the source of the link change information (S660).

Figure 19:
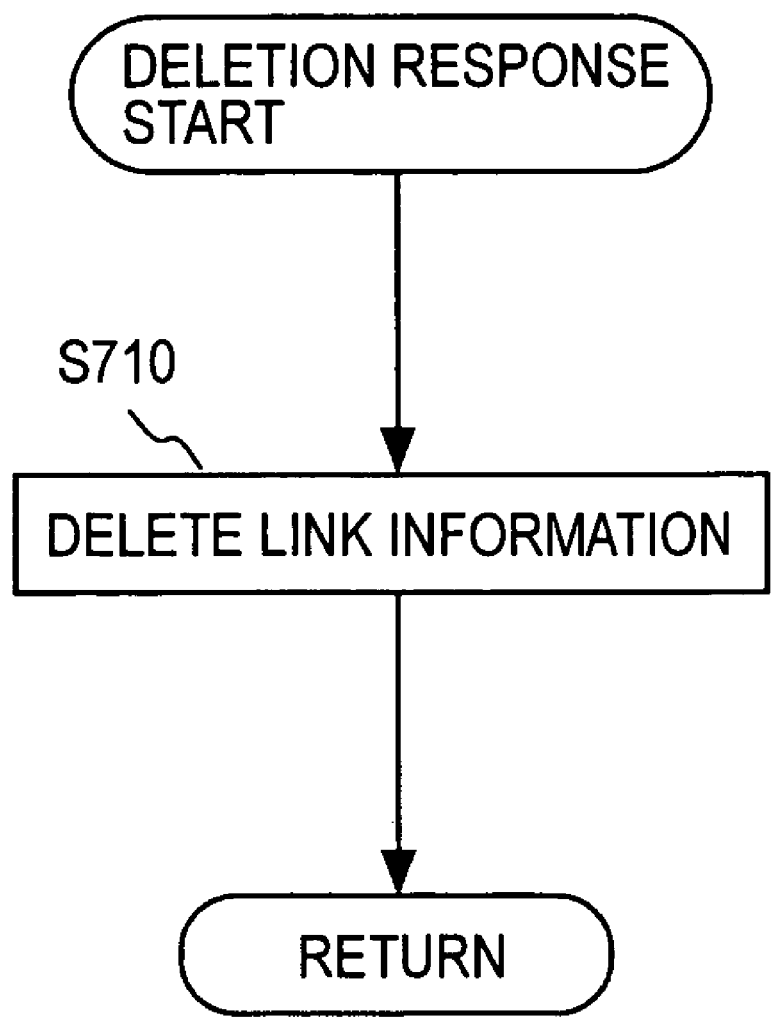
FIG. 19 is a flowchart showing a deletion response by the address notification device according to the present invention.

FIG. 19 is a flowchart showing the deletion response operation in step S460 in FIG. 16.

On the basis of the link change information received by the link information change part 138, the target link information is deleted from the link information list stored in the link information list storage part 106 (S710).

Figure 20:
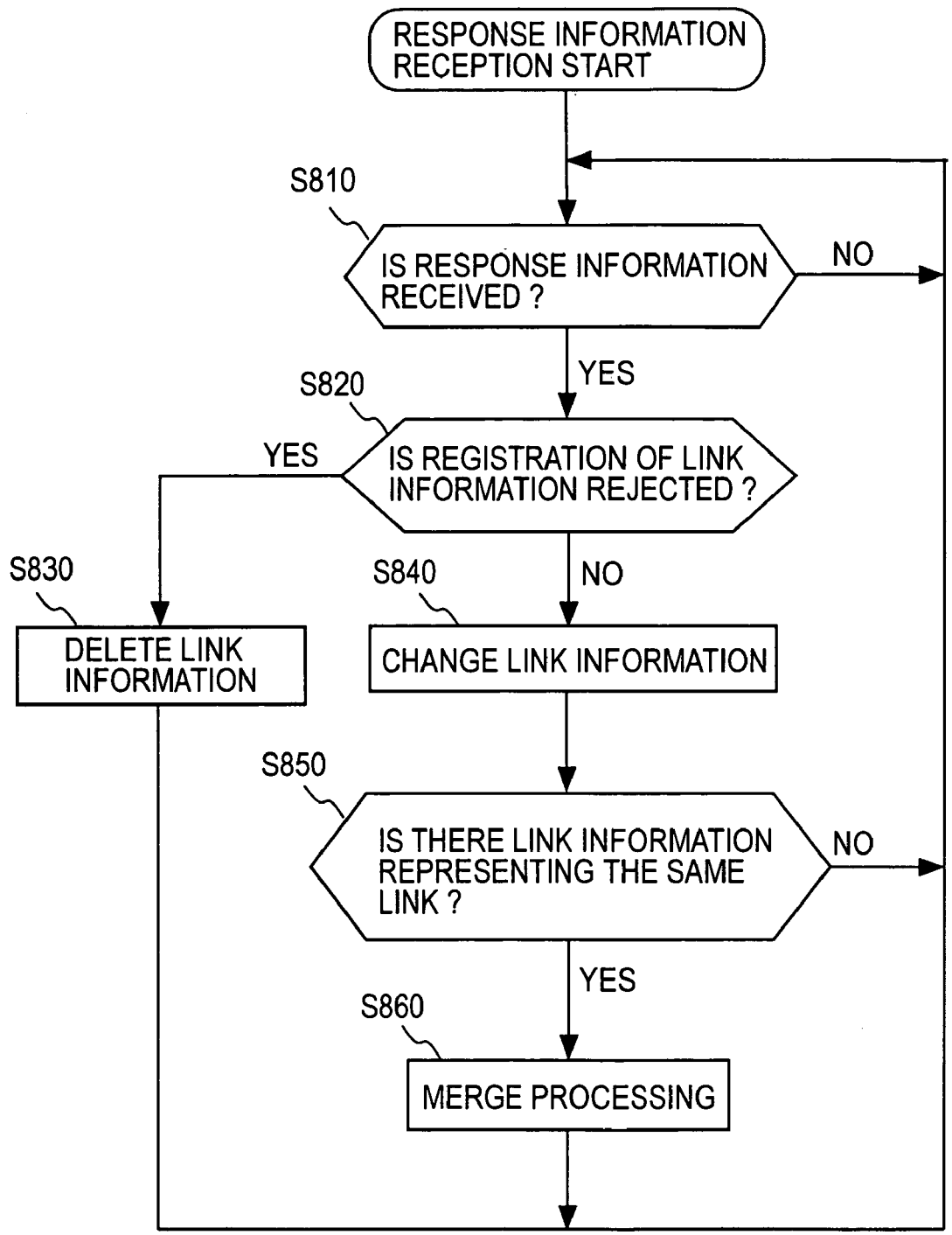
FIG. 20 is a flowchart showing the reception of response information by the address notification device according to the present invention.

FIG. 20 is a flowchart showing the response information receiving operation of the address notification device 100.

In the first place, the response information sent from the response information sending part 140 of the address notification device 100 of the communicating party is received by the link information change part 138 via the network interface 190 (S810).

Next, it is decided by the link information change part 138 as to whether the received response information indicates rejection of registration of the link information (S820), and when it is decided that the received response information indicates rejection of registration of the link information, the target link information is deleted by the link information change part 138 from the link information list stored in the link information list storage part 106 (S830).

On the other hand, when it is decided that the received response information does not indicate rejection of registration of the link information, the link information is changed by the link information change part 138 on the basis of the received response information (S840).

Next, a check is made to see if the link information, which forms the identical link as that by the link information changed by the link information change part 138 is contained in the link information list stored in the link information list storage part 106 (S850).

When it is decided that the link information forming the identical link as that by the link information changed by the link information change part 138 is contained in the link information list, merge processing is performed by the link information change part 138 (S860).

Figure 21:
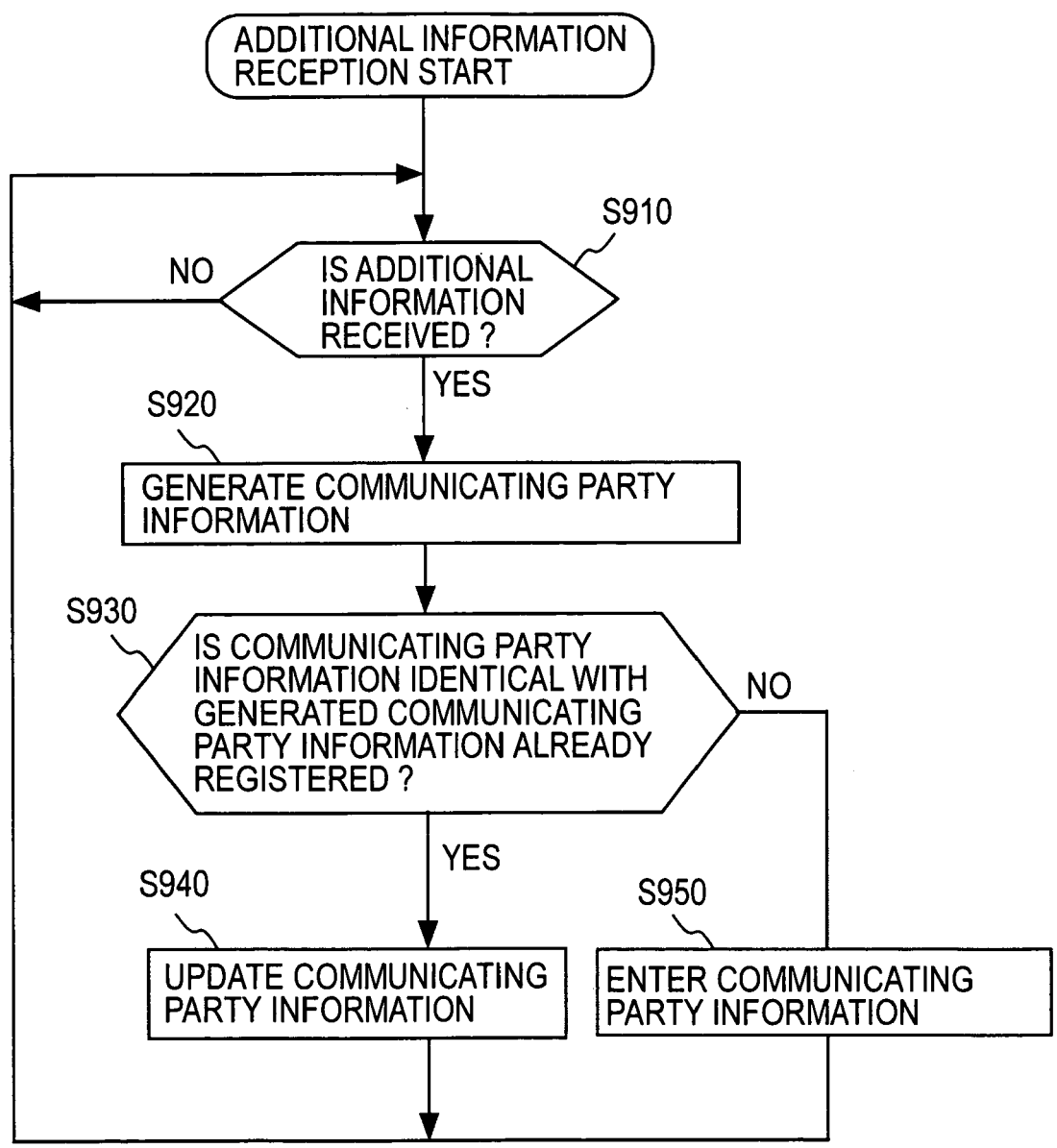
FIG. 21 is a flowchart showing the reception of additional information by the address notification device according to the present invention.

FIG. 21 is a flowchart showing the additional information receiving operation of the address notification device 100.

In the first place, the additional information sent from the link modification information sending part 136 of the address notification device 100 of the communicating party is received by the link information change part 138 via the network interface 190 (S910).

On the basis of the link change information and the additional information, communicating party information is generated (S920), and it is decided by the link information change part 138 as to whether communicating party information containing the user identification information 416 (FIG. 4) identical with that in the generated communicating party information is already entered in the communicating party information list (S930).

When it is decided that the communicating party information containing the identical user identification information as that of the generated communicating party information is already entered in the communicating party information list, the communicating party information already entered in the communicating party information list is updated by the link information change part 138 with the generated communicating party information (S940).

On the other hand, when it is decided that the communicating party information containing the identical communicating party address as that in the generated communicating party information is not entered in the communicating party information list, the generated communicating party information is entered by the link information change part 138 in the communicating party information list stored in the communicating party information list storage part 104 (S950).

Each constituent element of the address notification device 100 described above may be implemented by executing a program, which describes each operation explained above, by CPU that forms the address notification device 100.

That is, the own information list registration part 120, the link information select part 130, the link information registration part 134, the change information registration part 132, the link change information sending part 136, the link information change part 138, the response information sending part 140, and the communication part 180 may each be configured by CPU that executes the above-mentioned program.

The address notification device 100 may be configured to send/receive the link change information and send/receive the response information via the communication part 180.

The address notification device 100 may be configured to change the own address on a regular basis for a particular communicating party by performing the above-mentioned own address updating operation automatically and periodically for predetermined link information.

The address notification device 100 may be provided with a user interface for classifying, displaying and editing link information on the basis of the identity of the nickname 412 of the communicating party (FIG. 4) or the user identification information 416 (FIG. 4), by making the communicating party address 512 (FIG. 5A) of the link information contained in the link information list 510 (FIG. 5A) and the communicating party address 414 (FIG. 4) of the communicating party information contained in the communicating party information list 410 (FIG. 4) to correspond to each other.

Furthermore, at the time of sending the link change information, the address notification device 100 may perform processing such as attaching a digital signature to or encryption of the communication information containing the link change information by use of the own private key information stored in the profile information list 320 or the communicating party's public key information stored in the communicating party information list 410, respectively. To deal with this, the address notification device 100 may perform, at the time of receiving the link change information, signature verification or decryption by use of the public key information of the communicating party stored in the communicating party information list or the own private key information stored in the profile information list 320, respectively.

The invention claimed is:

1. An address notification device, comprising:
a link information list storage part storing a link information list composed of plural entries of link information each including an address of the address notification device, an address of a communicating party, and process information about a process to be applied to communication information to be communicated between said address of the address notification device and said communicating party address;
a link information select part selecting, among the plural entries of link information in said link information list, link information to be changed;
a change information registration part modifying the selected link information with change information representing the content of the change;
a link change information sending part sending link change information representing a change of the selected link information to a destination indicated by said communicating party address contained in the selected link information modified with said change information; and
a link information change part changing the selected link information on the basis of said change information modified therewith in response to response information sent from said communicating party in response to the sending thereto of said link change information.

2. The address notification device of claim 1, wherein:
said link information change part is configured to change an identified link information on the basis of a communicating party's link change information received from an address notification device of the communicating party; and
a response information sending part is provided for sending response information to the address notification device of said communicating party in response to said link change information of the communicating party when said identified link information is changed by said link information change part on the basis of said communicating party's link change information.

3. The address notification device of claim 1, wherein:
a link information registration part is provided for generating new link information having entered therein said change information and for entering said generated link information in said link information list.

4. The address notification device of any one of claims 1 to 3, wherein:
link information that is selected by said link information select part includes link information to be deleted from said link information list;
said change information registration part is configured so that when link information deleted from said link information list is selected by said link information select part, the change information to be entered indicates that said link information has been deleted from said link information list; and
said link information change part is configured to delete the link information selected by said link information select part from said link information list.

5. The address notification device of any one of claims 1 to 3, wherein:
said link change information sending part is configured to modify, at the time of sending said link change information, said communication information with signature information certifying that the communication information containing said link change information is free from tampering.

6. The address notification device of claim 4, wherein:
said link change information sending part is configured to modify, at the time of sending said link change information, said communication information with signature information certifying that the communication information containing said link change information is free from tampering.

7. The address notification device of any one of claims 1 to 3, wherein:
a device information list storage part is provided for storing information containing pieces of user identification information each associated with one of the addresses of the address notification device in said link information list and a profile information list including key information that provides security for communication by said address notification device in correspondence to said each piece of user identification information.

8. A method of address notification using an address notification device having a processor, comprising the steps of:
a) selecting, using the address notification device, among plural entries of link information in a link information list stored in a storage, link information to be changed, each entry of link information including an address of the address notification device, an address of a communicating party, and process information about a process to be applied to communication information to be communicated between said address of the address notification device and said communicating party address;
b) modifying, using the address notification device, the selected link information with change information representing the content of the change;
c) sending, using the address notification device, link change information representing a change of said link information, to a communicating party indicated by the communicating party address contained in said link information with said change information entered therein; and
d) changing, using the address notification device, in response to response information sent from said communicating party in response to step c), said link information in the storage with said change information entered therein on the basis of said change information modified therewith in step b).

9. The address notification method of claim 8 further comprising the steps of:
changing said link information on the basis of the link change information of the communicating party received from said address notification device of said communicating party; and
sending response information to said address notification device of said communicating party in response to said link change information of said communicating party when said link information is changed on the basis of the link change information of said communicating party.

10. The address notification method of claim 9, further comprising the step of merging the link information, changed on the basis of said link change information, and a different piece of link information in said link information list into one piece of link information if these two pieces of link information are identical with each other.

11. The address notification method of claim 8, further comprising the step of generating new link information with said change information entered therein and entering said new link information in said link information list.

12. The address notification method of any one of claims 8 to 11, wherein the link information selected for said change includes link information to be deleted from said link information list; and when the link information deleted from said link information list is selected, the change information to be entered indicates that said link information has been deleted from said link information list;
said method further comprising the step of deleting the link information selected for said change from said link information list.

13. The address notification method of any one of claims 8 to 11, further comprising the step of modifying, at the time of sending said link change information, said communication information with signature information certifying that the communication information containing said link change information is free from tampering.

14. The address notification method of claim 12, further comprising the step of modifying, at the time of sending said link change information, said communication information with signature information certifying that the communication information containing said link change information is free from tampering.

* * * * *